Aug. 30, 1932.  M. M. GOLDBERG  1,874,701
COMPUTING MACHINE
Original Filed June 14, 1926   16 Sheets-Sheet 1

Inventor
Maximilian M. Goldberg
By
Earl Beust
His Attorney

Aug. 30, 1932.  M. M. GOLDBERG  1,874,701
COMPUTING MACHINE
Original Filed June 14, 1926   16 Sheets-Sheet 4
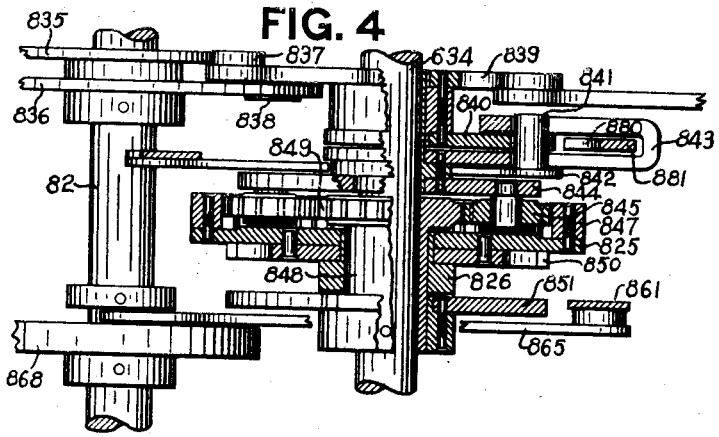
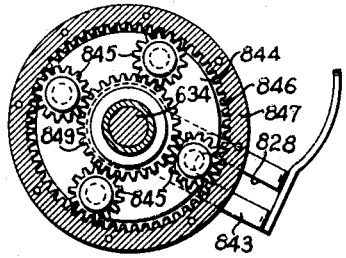
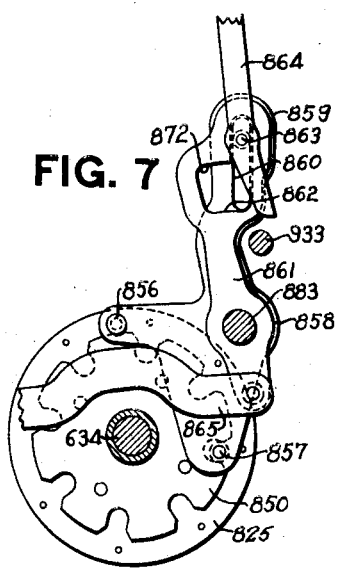
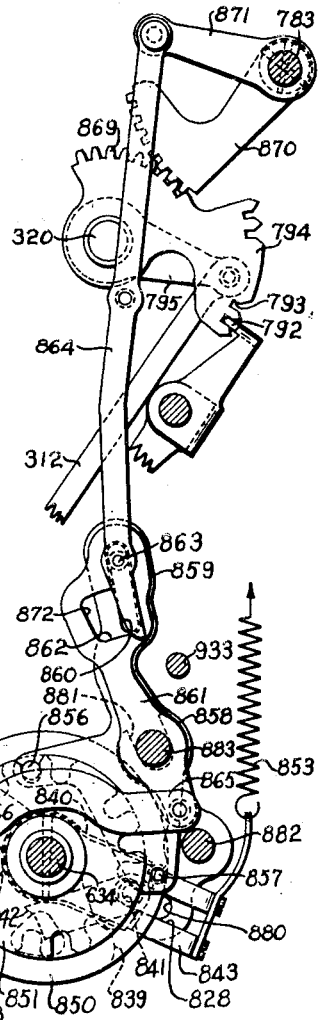
Inventor
Maximilian M. Goldberg
By
Earl Beust
His Attorney Aug. 30, 1932.  M. M. GOLDBERG  1,874,701
COMPUTING MACHINE
Original Filed June 14, 1926  16 Sheets-Sheet 5
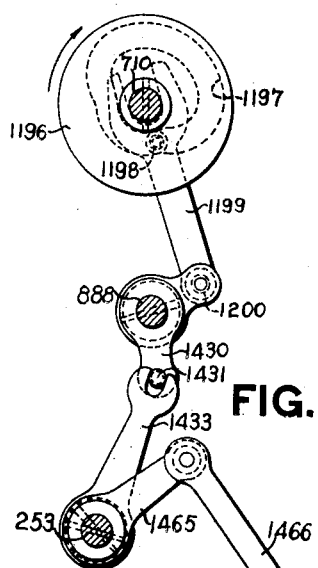
FIG. 8
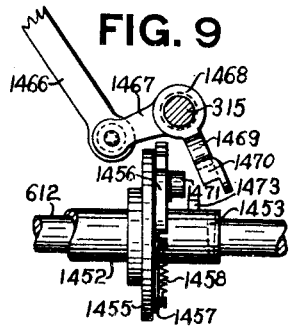
FIG. 9
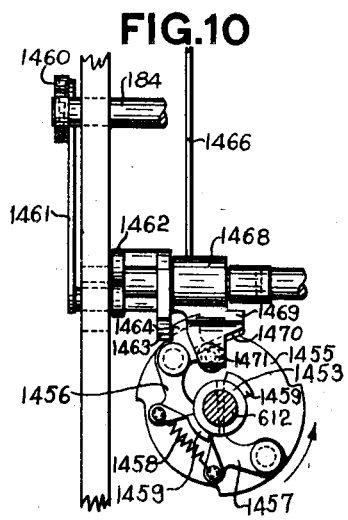
FIG. 10
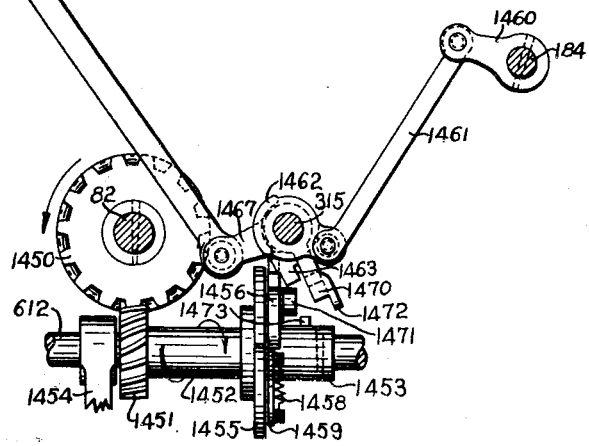
Inventor
Maximilian M. Goldberg
By Earl Beust
His Attorney Aug. 30, 1932.　　M. M. GOLDBERG　　1,874,701
COMPUTING MACHINE
Original Filed June 14, 1926　16 Sheets-Sheet 6

Inventor
Maximilian M. Goldberg
By
Pearl Beust
His Attorney

Aug. 30, 1932. M. M. GOLDBERG 1,874,701
COMPUTING MACHINE
Original Filed June 14, 1926 16 Sheets-Sheet 7

Inventor
Maximilian M. Goldberg
By
Carl Beust
His Attorney

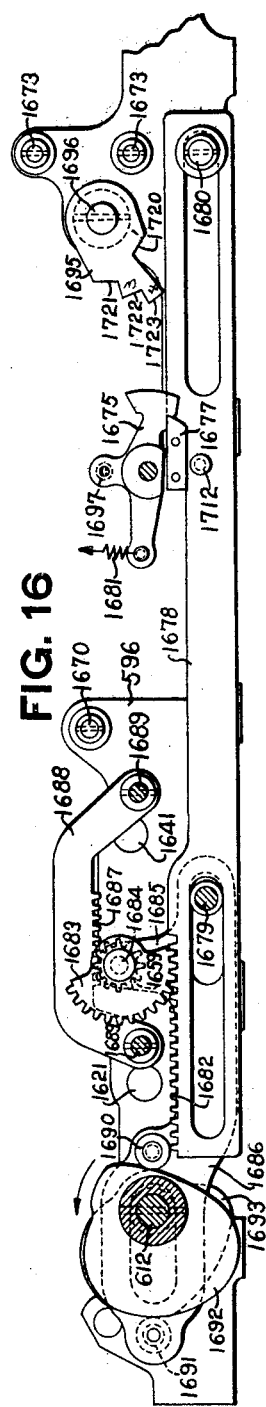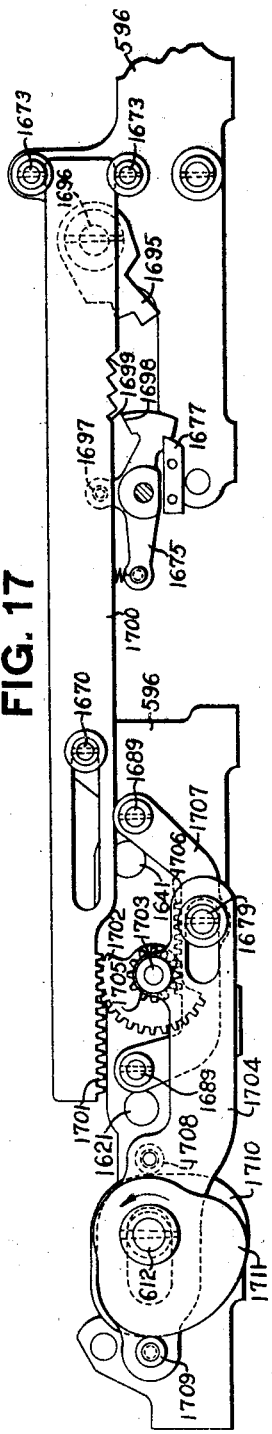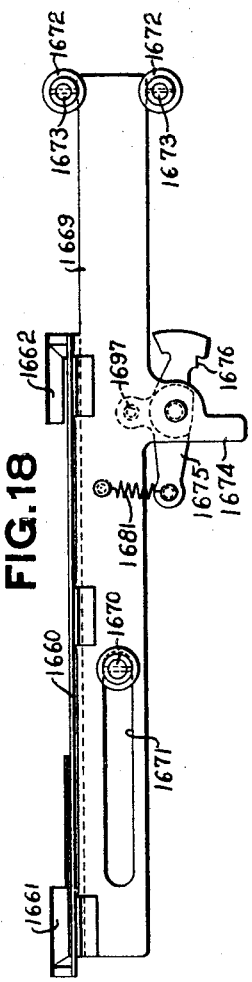

Aug. 30, 1932.                M. M. GOLDBERG                1,874,701
                              COMPUTING MACHINE
                       Original Filed June 14, 1926    16 Sheets-Sheet 9

Inventor
Maximilian M. Goldberg
By
Carl Benst
His Attorney

Aug. 30, 1932.  M. M. GOLDBERG  1,874,701
COMPUTING MACHINE
Original Filed June 14, 1926  16 Sheets-Sheet 10
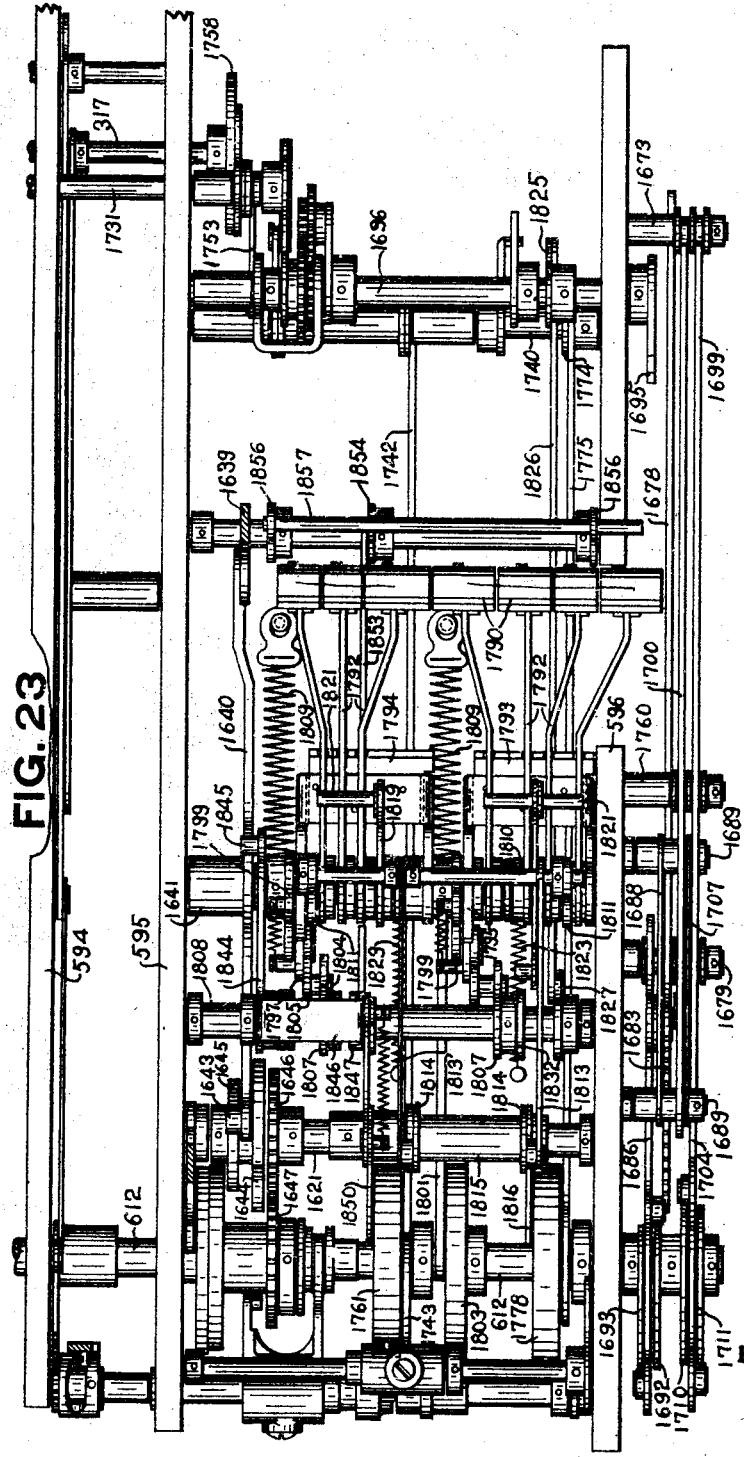
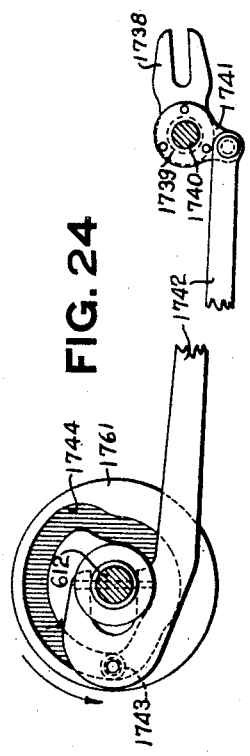
Inventor
Maximilian M. Goldberg
By Carl Benst
His Attorney Aug. 30, 1932.  M. M. GOLDBERG  1,874,701

COMPUTING MACHINE

Original Filed June 14, 1926   16 Sheets-Sheet 11

Inventor
Maximilian M. Goldberg

By

Earl Bunst

His Attorney

Aug. 30, 1932.  M. M. GOLDBERG  1,874,701
COMPUTING MACHINE
Original Filed June 14, 1926   16 Sheets-Sheet 12
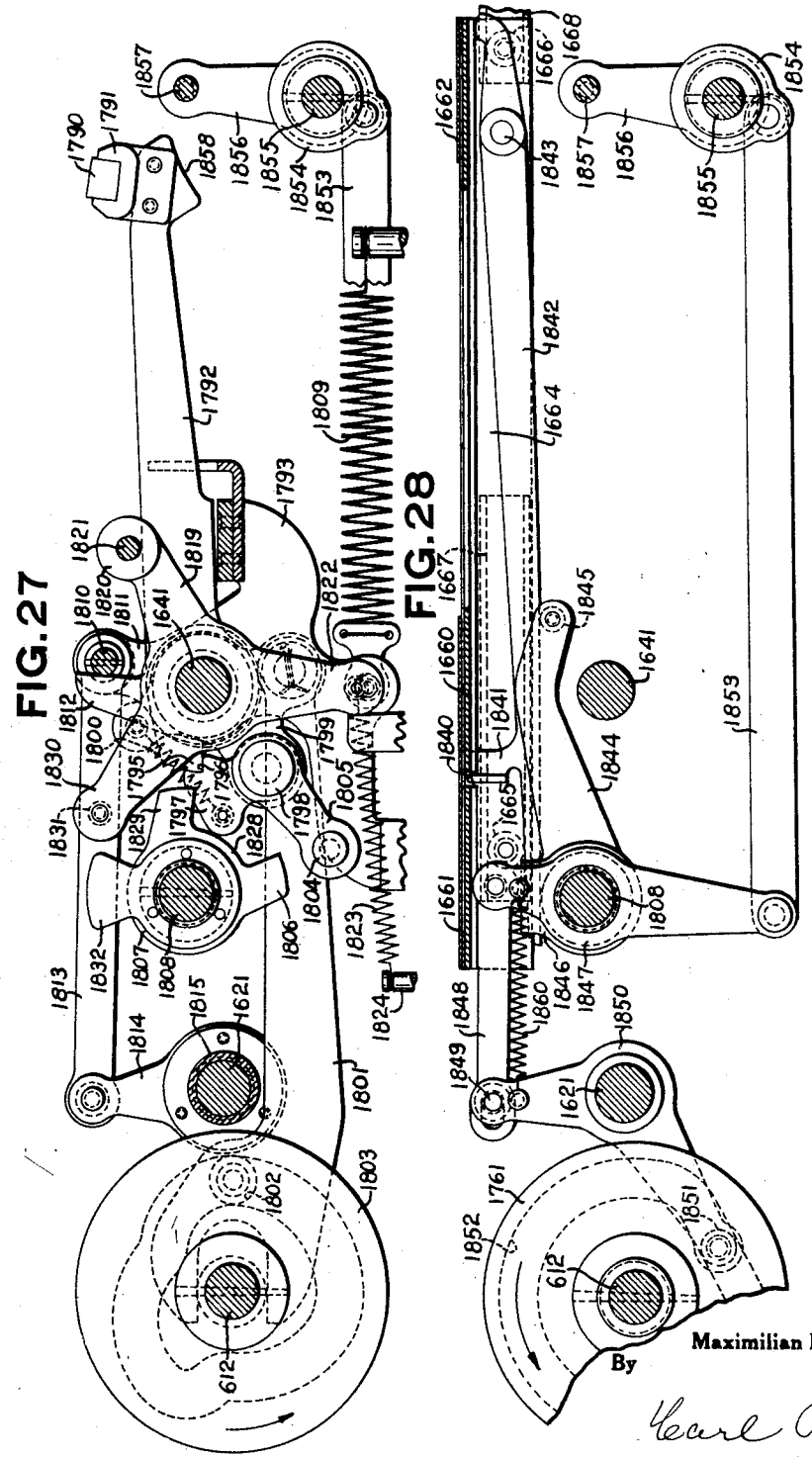
Inventor
Maximilian M. Goldberg
By
Carl Beust
His Attorney

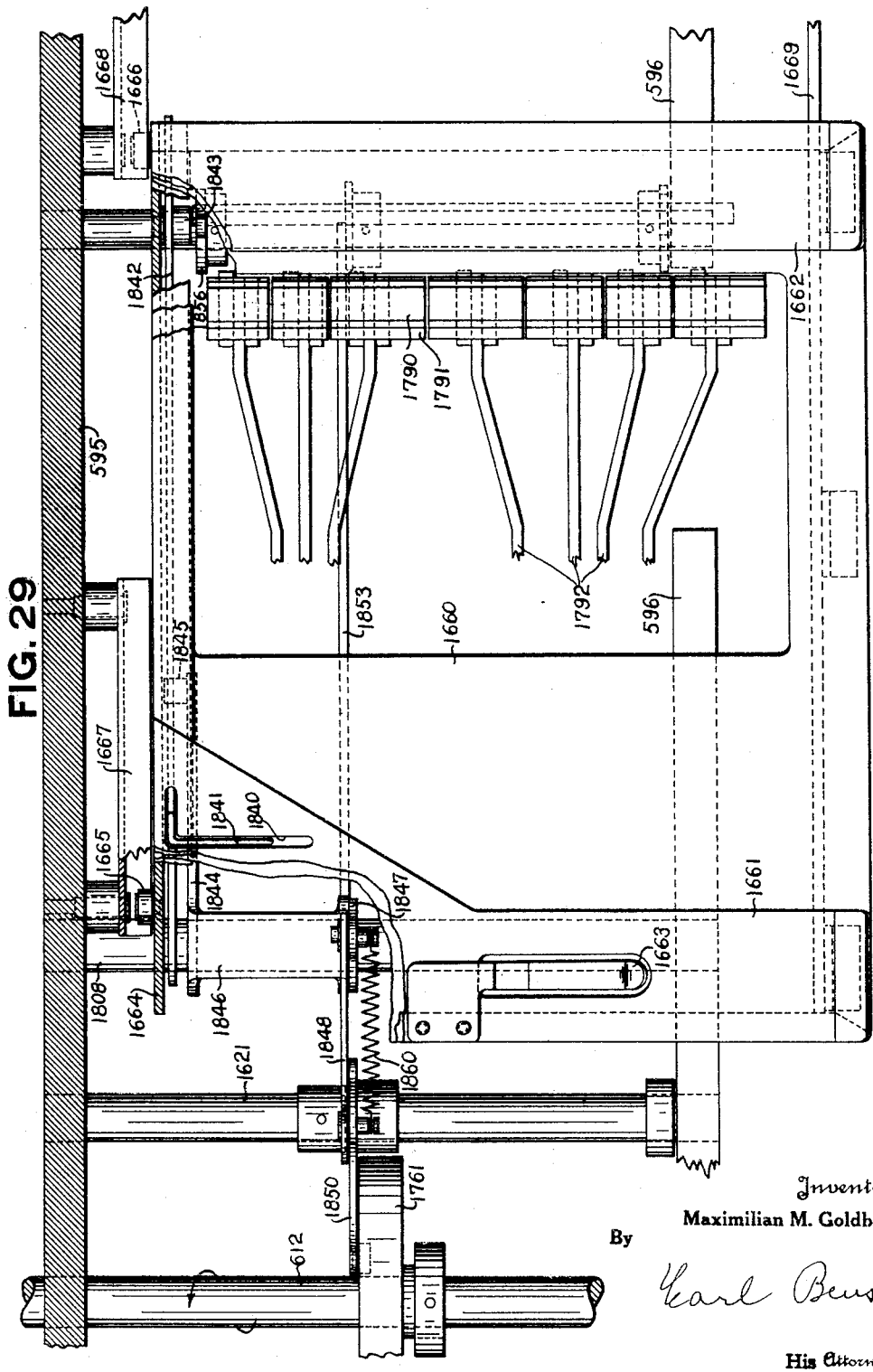

Aug. 30, 1932. M. M. GOLDBERG 1,874,701
COMPUTING MACHINE
Original Filed June 14, 1926   16 Sheets-Sheet 14

Inventor
Maximilian M. Goldberg
By
Earl Benst
His Attorney

Aug. 30, 1932.  M. M. GOLDBERG  1,874,701
COMPUTING MACHINE
Original Filed June 14, 1926   16 Sheets-Sheet 15

FIG.32

| DATE START | | TIME | CHECK NO. | NO. PIECES START | D.W.HRS.IFX. OTHERWISE PCS | PAGE OR JOB NO. | |
|---|---|---|---|---|---|---|---|
| | DEC-5-23 | 9 .5 | G121 | -2458 | ------ | -12,740.05 | Line 1 |
| | DEC-5-23 | 1 .8 | ---- | --.123 | ----Qu | ----24.58 | Line 2 |
| DATE FINISH | | TIME | TOTAL TIME | PRICE PER 100 OR D.W.RATE | --PW-- | -----3.02 | Line 3 |
| | | | | | ----Su | -----0.23 | Line 4 |

| DATE START | | TIME | CHECK NO. | NO. PIECES START | D.W.HRS.IFX OTHERWISE PCS | PAGE OR JOB NO. |
|---|---|---|---|---|---|---|
| | DEC 5 23 | 9 .5 | G121 | -2458 | ------ | -12·740.05 |
| | DEC 5 23 | 1 .8 | ---- | --.123 | ----Qu | ----24.58 |
| DATE FINISH | | TIME | TOTAL TIME | PRICE PER 100 OR D.W.RATE | --PW-- | -----3.02 |
| | | | | | ----Su | -----0.23 |

COMPTROLLER'S MEMO

Inventor
Maximilian M. Goldberg
By
Earl Benst
His Attorney

Aug. 30, 1932.  M. M. GOLDBERG  1,874,701
COMPUTING MACHINE
Original Filed June 14, 1926   16 Sheets-Sheet 16
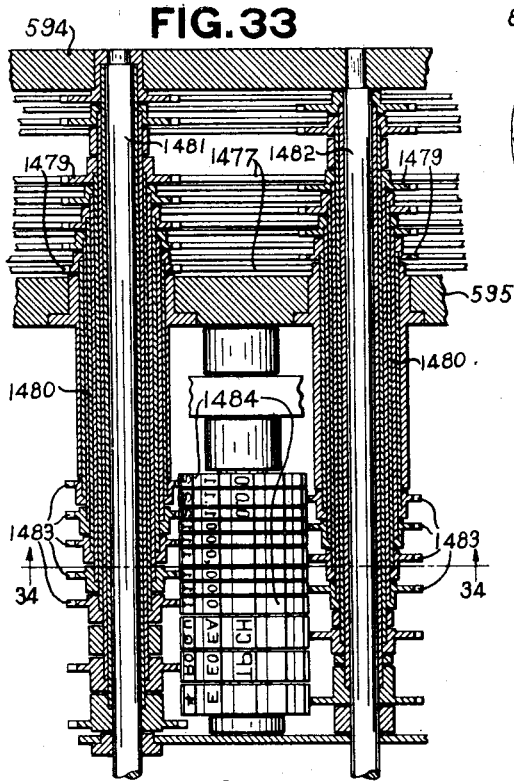
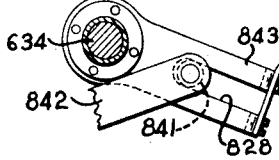
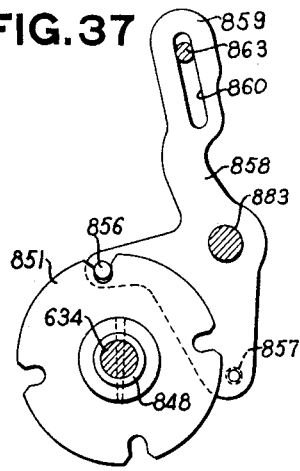
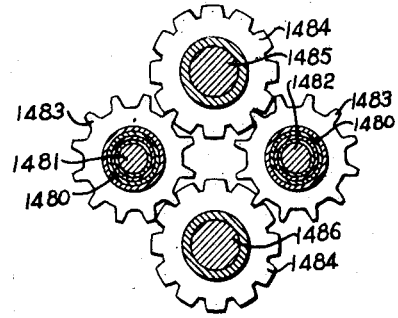
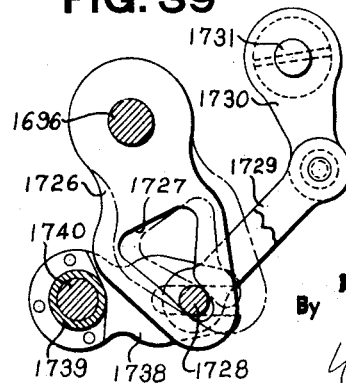
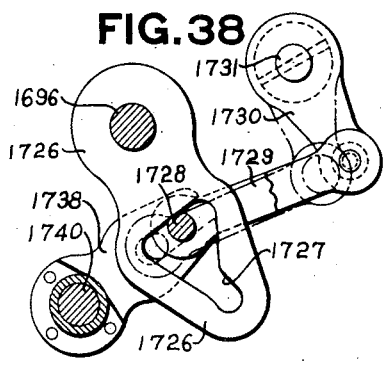
Inventor
Maximilian M. Goldberg
By
Earl Burst
His Attorney Patented Aug. 30, 1932

1,874,701

UNITED STATES PATENT OFFICE

MAXIMILIAN M. GOLDBERG, OF DAYTON, OHIO, ASSIGNOR TO THE NATIONAL CASH REGISTER COMPANY, OF DAYTON, OHIO, A CORPORATION OF MARYLAND

COMPUTING MACHINE

Original application filed June 14, 1926, Serial No. 115,998. Divided and this application filed February 27, 1930. Serial No. 431,939.

This application is a division of the co-pending application of Maximilian M. Goldberg, Serial No. 115,998, filed June 14, 1926, on which Letters Patent, No. 1,786,525, was granted on December 30, 1930, and relates particularly to the printing mechanism used in the machine disclosed in that application.

One object of the invention is to provide means for printing the multiplicand, the multiplier and the product on an inserted slip, together with other data.

Another object is to automatically select the line on the inserted slip on which a particular impression is to be made.

Another object is the provision of a novel carriage to support the slip, the carriage being so controlled as to be positively moved in both directions.

Another object of this invention is to provide a machine of the type above mentioned with a carriage to support insertable material upon which data may be recorded, and novel devices cooperating with the carriage to automatically adjust it to a plurality of positions during multiplying operations.

Another object of the invention is the provision of independently operable novel means for shifting the carriage in each of the directions in which it is adapted to be moved.

A further object of this invention is to provide a novel automatic stopping means for arresting a carriage of the type above mentioned in different positions.

Another object of this invention is to provide a novel record supporting carriage adapted to receive differential steps of movement in certain directions to present any one of a plurality of lines of a record to receive impressions thereon, in combination with novel means for positively moving the carriage to a corresponding one of another plurality of lines of the record to receive impressions.

Another object of this invention is to provide novel rack and gear devices to drive the carriage to its various positions, and a novel latch mechanism to connect and disconnect the rack and gear drive with the carriage at the proper time.

Another object to this invention is to provide a novel mechanism to control the above mentioned latch to differentially disconnect the latch from the carriage driving means, in combination with novel aligning devices associated with the latch, and with which the latch directly cooperates as it is disengaged from the carriage driver, so as to maintain the carriage in the position to which it was adjusted.

Another object of this invention is to provide a multiplying machine of the type above mentioned with a novel printing mechanism, having means for causing the multiplier, multiplicand and product to be printed in distinctive positions.

Another object of this invention is to provide a multiplying machine of the type above mentioned with type carriers adapted to print the multiplier and multiplicand on one line of record material, and the product on another line below the multiplicand.

Another object of this invention is to provide a multiplying machine of the type above mentioned with novel paper shifting means under the control of a bank of manipulative devices so that certain of the keys causes the shifting means to shift the paper to the same position, and other of the keys causes other of the paper shifting means to shift the paper to other lines, including a different line for each key.

Another object of this invention is to provide a machine of the type above mentioned with novel means to move record material to selectively position different portions thereof at the printing line, in combination with impression means operable to print long and short lines, including novel controlling mechanism for the impression means, whereby the printing of the long and short lines is dependent upon the portion of the record material which is positioned at the printing line at that time.

Another object of this invention is to provide an impression means for a machine of the type above mentioned with novel means to control the impression means to operate in whole or in part, depending upon the portion of the record material that is positioned at the printing line.

Another object of this invention is to provide a machine of the type above mentioned with an impression means and a novel operating means therefor, which operating means is under the control of a differential mechanism, which latter determines the effectiveness of the operating means.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 4 is a plan view, partly in section, of the control shaft driving and governing mechanism.

Fig. 5 is a side elevation, partly in section, of the planetary gearing used to drive the lower control shaft.

Fig. 6 is a detail side elevation of the connecting mechanism between the releasing differential mechanism and the control shaft driving aligning mechanism.

Fig. 7 is a detail side view of a portion of the mechanism shown in Fig. 6.

Fig. 8 is a detail side elevation of the printer disabling mechanism.

Fig. 9 is a detail view of the mechanism operated by the multiplying mechanism for disabling the printer on certain operations.

Fig. 10 is a detail front elevation of the printer disabling mechanism shown in Fig. 8.

Fig. 16 is a detail front elevation of a part of the mechanism for moving the carriage.

Fig. 17 is a detail front elevation of the remainder of the mechanism for moving the carriage.

Fig. 18 is a detail front elevation of the carriage proper.

Fig. 19 is a detail section on line 19—19 of Fig. 22.

Fig. 20 is a detail sectional view on line 20—20 of Fig. 22.

Fig. 21 is a detail sectional view on line 21—21 of Fig. 22.

Fig. 22 is a left-hand side elevation of the planetary gear mechanism for differentially stopping the printer carriage.

Fig. 23 is a plan view of the impression mechanism and the operating and controlling means therefor.

Fig. 24 is a detail side elevation of the cam and pitman for operating the planetary gear.

Fig. 25 is a vertical section taken just inside the printer front frame.

Fig. 26 is a detail front elevation of the mechanism for holding up the lower printing hammers.

Fig. 27 is an enlarged detail view of the lower hammer operating and controlling mechanism.

Fig. 28 is an enlarged detail view of the mechanism for disabling the lower hammer when no slip has been placed on the slip table or carriage.

Fig. 29 is a top plan view of the slip table or carriage with the mechanism for disabling the lower hammers when no slip is on the carriage.

Fig. 32 is a facsimile of one of the time slips or record cards such as used in connection with this machine, the corner of the slip being folded over so as to show the carbon back and the duplicate slip.

Fig. 33 is a diagrammatic plan view, in cross-section, of the sleeves for setting the amount and special type wheels.

Fig. 34 is a detail view in elevation, of the amount type wheels and their setting pinions, taken on line 34—34 of Fig. 33, and looking in the direction of the arrows.

Figs. 35, 36 and 37 are detail views of mechanism shown in Fig. 6.

Figs. 38 and 39 are detailed views of a part of the mechanism shown in Fig. 20, showing the parts in moved positions.

*General description*

Figure 1:
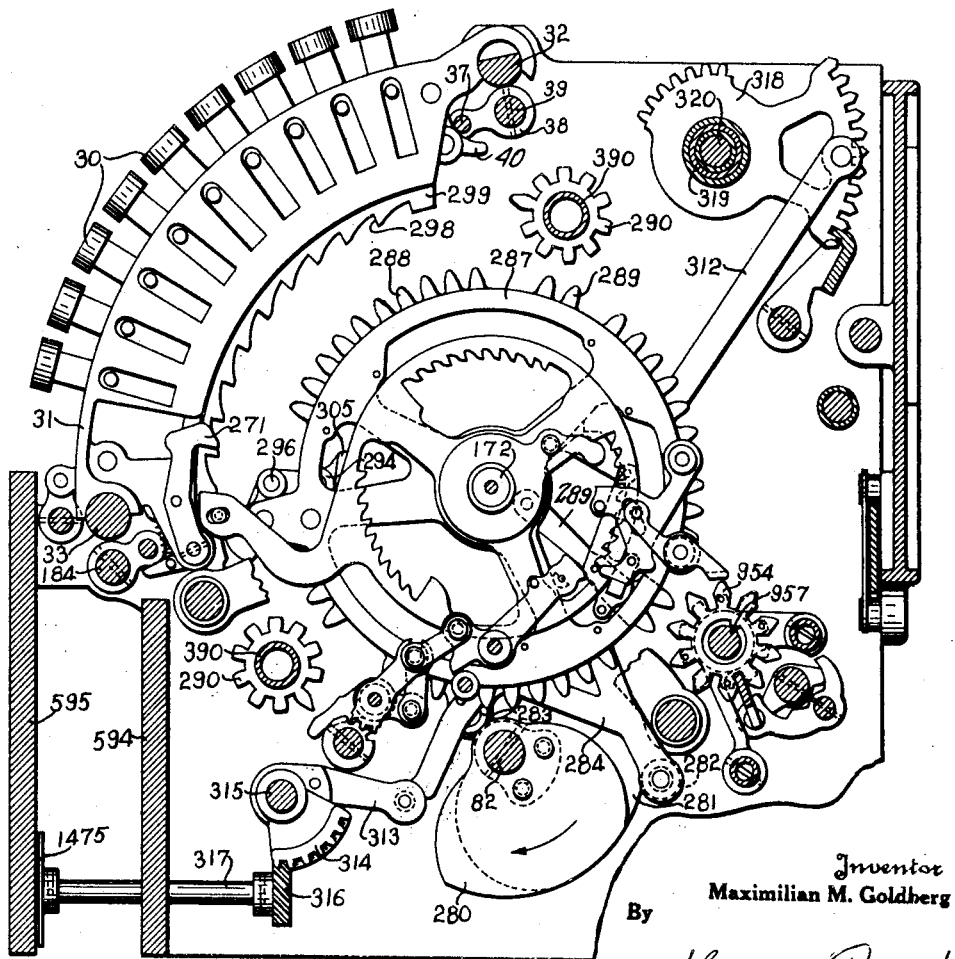
Fig. 1 is a section through the machine taken just to the right of one of the banks of amount keys.

This machine is of the type shown in the patents to Frederick L. Fuller, Nos. 1,242,170 and 1,394,256, granted on October 9, 1917 and October 18, 1921, respectively; and to Bernis M. Shipley, No. 1,619,796, granted March 1, 1927. Reference should be made to these patents for a complete understanding of the adding, indicating and normal total-taking mechanisms as, with various changes and additions to be hereinafter described, the parts mentioned, of the machine embodying this invention, are the same as shown and described in said patents.

The machine embodying this invention is designed for factory accounting. It will, generally, be located in the departmental office. When a job is assigned to an operator, a time slip in duplicate is inserted in the machine and the following entries made thereon; the date, the time the job was started, the operator's check number, the number of pieces given him for operation, and the job number. When the job is finished the time slip is returned to the machine and the time the job was finished is set up, together with the price per hundred pieces, and the number of pieces actually completed. The machine is then operated and the data just mentioned are printed just beneath the entry made at the beginning of the operation.

The machine automatically multiplies the number of pieces finished, by the rate per hundred, and prints the product, which is the amount due the operator, on the third line. If there is any additional amount due the operator for the time necessary to set up the job or for any other reason, such additional amount will be printed on the fourth line upon depression of the proper keys.

It can be seen from the above that this system provides very complete printed information about the entire operation, and these records may then be turned over to the paymaster and the accounting department for their information.

The machine is provided with 18 classification totalizers. Some of the totalizers are selected by keys, known as quantity keys, and they accumulate the multiplicand or number of pieces, while the other totalizers are selected by keys, known as product keys, and they accumulate the products. The keys are arranged in two banks, one bank containing nine product keys and the other bank containing six quantity keys, and three product keys. The bank containing the nine product keys is known herein as the "product" bank, while the bank containing the six quantity keys and the three remaining product keys is known as the "quantity" bank. The addition of the multiplicand in a quantity totalizer and of the product in a product totalizer takes place during a single multiplying operation.

It is evident that the machine can be used equally well for registering day-work operations. All that is necessary is to set up the elapsed time in hours and tenths of hours and the rate per hour, whereupon the machine will compute the amount due the operator, add this amount into the day-work product totalizer, and print the entire transaction both on the record strip and the inserted slip. A device for quickly figuring the elapsed time is attached to the machine.

The amount or multiplicand has two decimal places as is usual in cents and dollars keyboards. Means is provided for placing the decimal point in the multiplier, in any one of four places. In the embodiment of the invention as disclosed herein, the largest multiplier that it is possible to use is 99999, while the smallest is .0001. However, these can be varied if desired, and it is not intended to limit the invention to such limitations.

If a product ends in more than two decimals, resulting in what is herein termed a "rough" product, the decimals in excess of two are automatically dropped and "one" is added to the digit in the second position if the amount of the third digit was five or more. The product of $.9 \times .05 = .045$ (rough product), and in such case the machine automatically drops the 5 and adds "1" in the second decimal order and prints .05 as the finished product.

But, take the example $.9 \times .06 = .054$ (rough product), the machine automatically drops the 4 but does not add "1" in the second decimal order, because the number dropped from the third order did not amount to 5, therefore, the machine prints .05 as the finished product.

This dropping of the superfluous decimals and addition of "one" in the second position to get the "finished" or "final" product, takes place immediately after the "rough" product is obtained. It is evident that the keys representing the multiplicand should be released before the superfluous decimals are dropped and the "one" added in the second position, otherwise a wrong result would be obtained as the machine continues to operate—three more cycles being necessary to finish the complete multiplying operation. Mechanism is, therefore, provided for stopping the machine immediately if any one of the amount keys, representing the multiplicand, fails to return to its normal position when released, or if any key is held down in an attempt to manipulate the machine. The machine then remains inoperative until a manual key release is operated to release the depressed keys so that they can return to normal. The operation of the machine can then be completed.

The printing mechanism is designed to print the entries mentioned above, with the exception of the date, on a record strip retained in the machine. A novel device is included in this mechanism operated by a small hand lever, which device is capable of disabling the record strip feeding and impression mechanism during adding and multiplying operations. When anyone of the totalizers is cleared it is essential that the total thereon be printed as otherwise it would be lost. The mechanism is, therefore, so designed that the record strip feeding and impression means will operate on total-taking operations even if these means were rendered inoperative, previously, by the hand lever.

The printer has a novel line selecting mechanism. The first entry, which comprises the miscellaneous information, is printed on the first line of the slip. Then the multiplicand and the multiplier are printed on the second line. The product is printed on the third line, and any special charge is printed on the fourth line. The carriage moves to these various positions automatically under control of the various keys governing the entries. During the printing of the first two lines all the impression hammers operate, but when printing on the last two lines all of the hammers are rendered inoperative except the ones for the amounts and the designations of the keys of the quantity and product banks.

DETAIL DESCRIPTION—KEYBOARD

*Amount keys*

There are seven banks of amount keys 30 (Fig. 1) in the keyboard of this machine. They are of the same type as those shown in the patents above referred to, and will therefore, be but briefly described herein.

Each of the keys 30 is slidably mounted in a key frame 31 carried by transverse rods 32 and 33 supported by the side frames of the machine proper. The keys are flexibly held in their normal undepressed positions by suitable spring actuated detents (not shown). The keyboard is of the flexible kind, that is, a depressed key is released by the depression of another key in the same bank.

The keys are released at a predetermined point in the operation of the machine by a rod 37 carried by a plurality of arms 38 fast on a shaft 39, known herein as the release shaft. When the keys are to be released this shaft is rocked in a clockwise direction and the rod 37 contacts tails 40 integral with the detent supporting arms and rocks the same, whereby the detents are shifted downwardly, thereby releasing the depressed keys and permitting them to be returned to their normal positions.

*Quantity and product banks*

The quantity and product banks of keys are substantially identical in construction, and as these banks of keys do not have any direct bearing upon the claims in this divisional application, only one bank, namely the product bank, (Fig. 2) has been shown, and the description thereof will be very brief.

The keys in the quantity bank are used in the multiplying machine to select quantity totalizers into which the totals of time in hours used by workmen are accumulated, and the product keys are for the purpose of selecting totalizers into which the product of any multiplying operation will be added.

Figure 2:
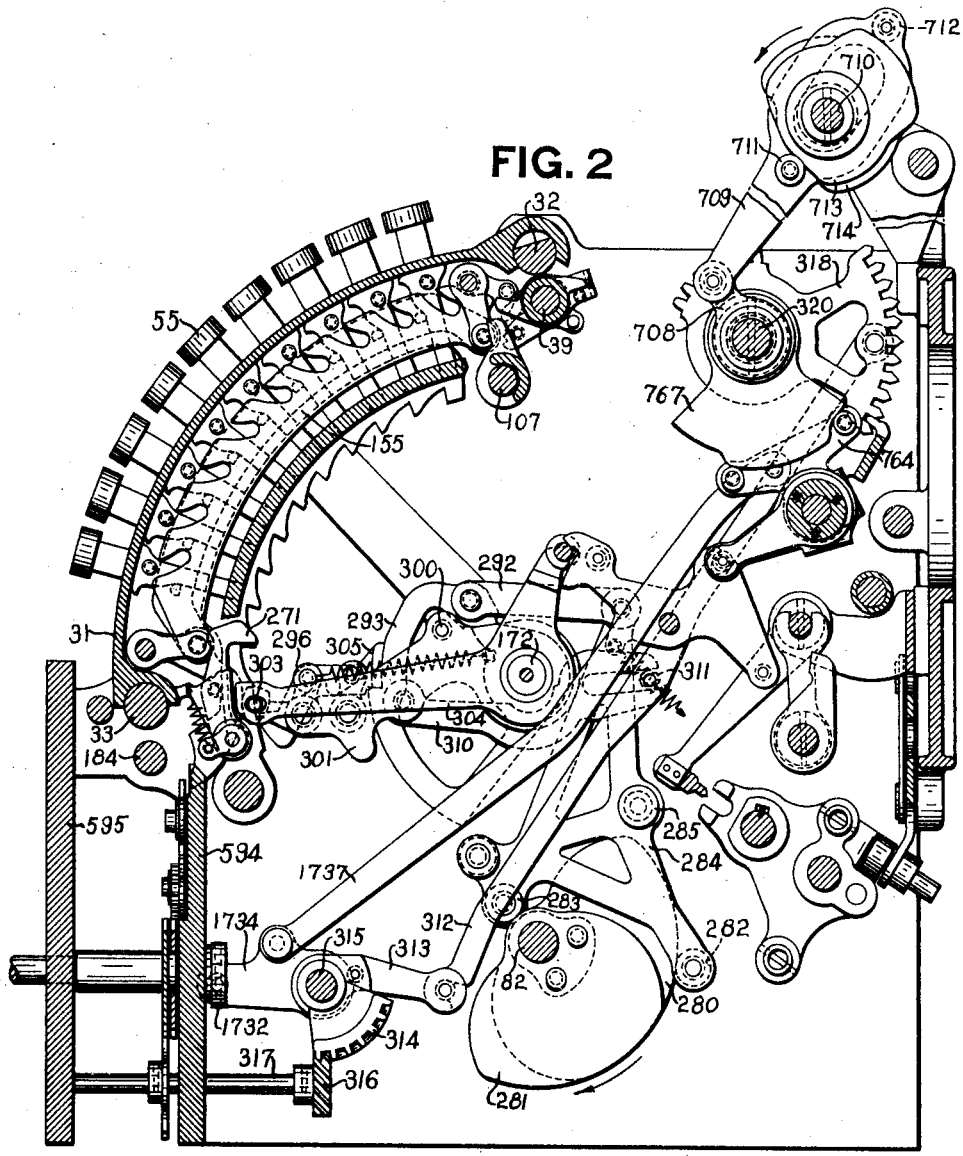
Fig. 2 is a section through the machine taken just to the right of the "product" bank.

The product keys 55 are shown in Fig. 2; they are slidably mounted in a key frame 31, and when depressed, are held in depressed positions by the locking detent 155 in the manner fully illustrated and described in the parent Patent No. 1,786,525.

*Release keys*

The release bank contains four keys 56, 57, 58 and 59 (Fig. 3) all of which are adapted to release the machine for operation. The two upper keys 56 and 57 are used in adding operations, and the two lower keys 58 and 59 are used in multiplying operations. The keys 56 and 58 are "free" keys, that is, there is no connection between these keys and the other banks of control keys. These keys 56 and 58, are for use if the machine is to be used as an adding or multiplying device without segregating the totals in the various classification totalizers. The other two keys 57 and 59, respectively, are connected with the two banks of control keys by interlock mechanism which will be described later. When any one of these four keys is depressed, the machine will be released and the motor circuit automatically closed to consummate the operation.

*Operating mechanism*

The operating mechanism in general is not shown in this divisional application because it is not thought necessary to do so, and for a full and clear description thereof reference may be had to the parent patent.

The shaft 82 (Figs. 1, 2 and 3) is the main operating shaft of the machine, and it may be driven either by a hand operated lever or a motor, as is clearly shown and fully described in the parent patent above referred to.

*Release mechanism*

The machine is normally locked and is released for operation on adding operations by either of the keys 56 or 57 (Fig. 3), and on multiplying operations by either of the keys 58 or 59.

In order to release the machine the release bank of keys carries a detent 100 pivoted at its upper and lower ends respectively to arms 101 and 102 which are in turn pivotally mounted on the key frame 31 for this bank. This detent has four curved notches 103 cut therein in such a position that each of them will cooperate with a pin 104 carried by each of the release keys. It can be seen from this figure, that when any one of the release keys is depressed, the pin 104 thereon will enter the notch 103 appropriate thereto and cause said detent to be moved in a downward direction.

The arm 101 has an extension which carries a pin 105. This pin projects through a bifurcated arm 106 loose on a shaft 107 supported by the side frames. The arm 106 is rigidly connected to a locking detent 108 for the release shaft 39, by a pin 109 carried by the detent. The detent 108 has a square end which cooperates with a flattened stud 110, carried by an arm (not shown) loose on the release shaft 39. The release shaft normally tends to rock in a clockwise direction by means well known in machines of this type, and as fully described in the parent case.

When a release key is depressed and the detent 100 shifted, the pin 105 on arm 101 will rock the arm 106 counter-clockwise. As this arm 106 is secured to the detent 108, this detent will also be rocked until the squared end thereof passes out of the path of the stud 110. As the release shaft constantly tends to rock in a clockwise direction, it is evident that as soon as the detent 108 passes out of the path of the stud 110, the stud 110 will assume a position between the locking detent 108 and a non-repeat detent 116 which lies in the same plane. The purpose of the non-repeat detent 116 is to prevent a second operation of the machine in case the operated release key is held down. This detent 116 is rendered ineffective on multiplying operations in a manner fully described in the parent case.

When the stud 110 has assumed its position between the detent 108 and non-repeat pawl 116 it has effected the release of the machine in the manner fully illustrated and described in the parent case. As is also fully described therein, the release shaft 39 is rocked counter-clockwise (Fig. 3) near the end of each adding operation.

Differential mechanism

The differential mechanism of the machine proper is employed to select and differentially operate the different totalizers. The differential mechanism also sets up the indicators (not shown herein) and the appropriate type wheels under control of the keys. The amount differential mechanism will be described first.

Amount of differential unit

There is one complete differential unit for each amount bank, but as they are identical in construction and operation, only one will be described.

To drive the differential mechanism of the machine, the main drive shaft 82 is provided with a plurality of pairs of cams 280 and 281 (Fig. 1), each pair cooperating with rollers 282 and 283, carried by Y-shaped levers 284, of which there is one for each bank of amount or control keys in the machine. Each of these levers is pivoted at 285 (Fig. 2) on a corresponding frame or hanger (not shown herein). Loosely mounted on hubs 172 supported by the frames which support the differential units, adjacent the amount banks of keys, are differentially movable totalizer actuators 287 carrying racks 288 and transfer arms 289 for operating regular totalizer pinions 290, and multiplying totalizer pinions 954. The construction and operation of the transfer mechanism are shown and described in the patents cited, to which reference may be had for disclosure thereof.

Figure 3:
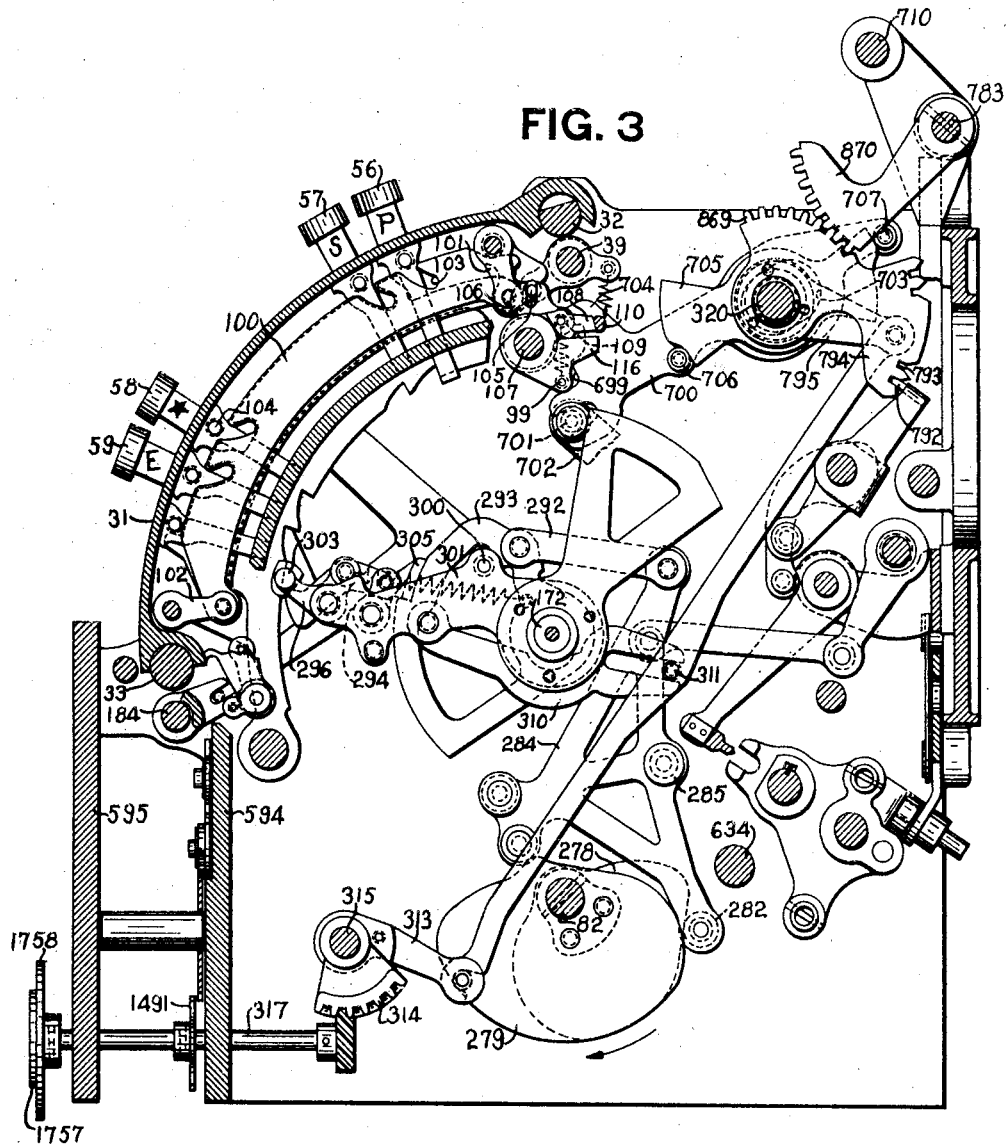
Fig. 3 is a section through the machine taken to the right of and looking toward the release bank.

Since the amount differential mechanism is not fully detailed in this divisional application it will be necessary to refer to the differential mechanisms associated with the control and release banks in Figs. 2 and 3, respectively, which figures show fully the driving devices for the differential mechanisms.

The levers 284 at the end of their upwardly extending arms are pivotally connected by links 292 (Figs. 2 and 3) to driving segments 293 loose on said hubs 172. The driving segments 293 adjacent the banks of amount keys are connected to the differentially movable actuators 287, by latches 305 (Fig. 1), each of which is supported by an arm 294 and a lever 296 pivoted on the corresponding differentially movable actuator. Springs (in Figs. 2 and 3) hold the rear ends of said latches in engagement with shoulders 297 on the driving segments. When the segments 293 are driven by their cams 280 and 281, the differentially movable actuators 287 are carried, with their latches, up to a point where the forwardly extending arms of the levers 296 engage the depressed amount keys. Such engagement results in disengagement of the latches from the driving segments and engagement of the forward end of each latch with the particular one of a series of notches 298, opposite the latch and formed in a plate 299 supported by the frame 286.

Upon return movement of the driving segment to its normal position, a pin 300, like that shown in Figs. 2 and 3, mounted on the differentially movable actuator 287, is engaged by the inside of the driving segment, and said actuator is returned thereby to its normal position. If no key is depressed in an amount bank, the zero stop pawl 271 for that particular bank will operate the latch to arrest the differentially movable actuator in its zero position. When a key is depressed, the zero stop pawl is moved out of operative position in a manner well known in machines of this type.

Control and release banks—differential mechanism

The differential mechanism which cooperates with the keys of the product and release banks is very similar to that used with the amount banks, the differentially movable actuators 287 and racks 288 being omitted, and arm 301 (Figs. 2 and 3) used in place thereof. If no key in the product bank is depressed, the latch appropriate thereto is disconnected from its driver 293 in the zero position due to the engagement of an arm 304 with the zero stop pawl 271. Each arm is pivoted on the hub 172. A pin 303 carried by each lever 296 extends through a slot in the arm 304, so that when said arm comes into contact with the zero stop pawl, the lever 296 will be rocked counter-clockwise to disconnect the latch from its driving segment 293.

Appropriate to each amount differential mechanism and to the differential mechanisms for the product and release banks, is a beam 310 (Figs. 2 and 3) pivoted at one end to the differentially movable actuator 287 for the amount banks and to the arm 301 for the other banks, and bifurcated at its opposite end to straddle a roller 311 carried by a link 312. At its lower end this link is pivoted to an arm 313 fast on a spiral segment 314 loose on a shaft 315. The spiral segment meshes with a spiral gear 316 fast on a shaft 317, which, through mechanism to be later described, transmits the movement of the differentially movable actuator to the type wheels. At its upper end the link 312 is pivoted to a segment 318 fast to one of a plurality of sleeves 319 supported by the shaft 320. These members adjust indicating mechanism not shown herein.

Totalizers

The totalizers are shown in this application only in Fig. 1. There are two lines of regular totalizers, each totalizer consisting of a plurality of pinions 290 loosely mounted on a tube 390 supported by appropriate frames. These frames are laterally shiftable of the machine, as is fully illustrated and described in the above mentioned Fuller and Shipley patents. The two regular lines are adjustable under control of the quantity bank (not shown herein), and product bank (Fig. 2).

Multiplying mechanism

Since this application refers chiefly to the printing mechanism, only that much of the differential mechanism of the parent case is shown and described as is necessary for a general understanding of how the type wheels are set up under control of the several banks of keys.

Various forms of mechanism for accomplishing multiplication are known in the calculating machine art. The present machine uses one of these forms. In order to perform multiplication, the multiplicand is added into a special totalizer 954 (Fig. 1) as many times as may be required by the multiplier. This totalizer is shiftable laterally of the actuators on a shaft 957, and is automatically positioned under control of the multiplier keys (not shown in this divisional application).

The totalizer starts at the left-hand side of the machine and is engaged with each denominational order as many times as there are units in the digits of the multiplier. Thus, if the multiplier is 321, the totalizer will be moved to its first position and will be held there, while the multiplicand is added once thereon. It is then shifted to its second position, and it remains there during two cycles of the operations, whereupon it is moved to its third position. The totalizer remains in the third position long enough for the multiplicand to be added three times thereon.

The product has now been registered on the special totalizer. If there has been one or more decimal places in the multiplier, the product is corrected, that is, if the decimal places exceed two in the product and the amount in the third decimal place exceeds five, then an extra unit is added to the totalizer wheel in the second decimal place. The extra decimals over two are dropped by returning the multiplying totalizer wheels upon which the extra decimals were accumulated to zero. The amount differential mechanism is then set under control of the remaining multiplying totalizer wheels, and the product is transferred to the selected product totalizer or totalizers, the type wheels, and the indicator tablets, in order to properly register, record, and indicate the product of the multiplying operation. At the end of such transfer operation the multiplying totalizer wheels are all left standing at zero, ready for the next multiplying operation. The indicator mechanism is fully shown and described in the parent Patent No. 1,786,525.

Multiplier keys and multiplier differential mechanism

The engaging and shifting movements of the special multiplying totalizer, and the differential mechanism which cooperates with the multiplier keys to determine how many times a number is to be accumulated into the multiplying totalizer to produce a product, are fully illustrated and described in the parent Patent No. 1,786,525, and reference may be had thereto for such mechanism.

Means for maintaining machine in released position during a plurality of cycles of operation Every complete multiplying operation consists of four regular cycles of the drive shaft 82, plus the number of cycles necessary to perform the multiplication controlled by the depressed multiplier keys. The first regular cycle occurs before the multiplying cycles, but the second, third and fourth regular cycles occur after the multiplying cycles have been completed. It, therefore, becomes necessary to maintain the machine in a "released" condition during a plurality of cycles of operation.

During the first regular cycle, a coupling device (fully illustrated and described in the parent case) is shifted to uncouple the release shaft from its restoring mechanism, so that the release shaft restoring lever will have no effect upon the release shaft, and consequently, the shaft 39 will not be restored near the end of the first cycle.

This uncoupled condition between the release shaft 39 and the restoring lever is maintained during all of the several multiplying cycles except the last multiplying cycle, during which cycle the coupler is shifted to couple the release shaft with its restoring mechanism, whereupon the release shaft is operated by the restoring lever to release all depressed amount or multiplicand keys 30, and multiplier keys 62, but any depressed quantity key, product key 55, or release key 58 or 59, shall not be released during the last multiplying cycle. These latter keys 55, 58 and 59 must remain in their depressed positions until the fourth or last regular cycle, which occurs after the multiplying cycles have been completed.

Since one of the release keys 58 or 59 is maintained in its depressed position until the last regular cycle, it is apparent that the release shaft 39 will be released at the beginning of the second regular cycle which occurs immediately following the last multiplying cycle.

It will be recalled, that when the machine is released by the depression of one of the release keys, the arm 106 and locking detent 108 (Fig. 3) are rocked counter-clockwise, and the stud 110 moves between the detent 108 and the non-repeat detent 116. Now, since the function of the non-repeat detent is to prevent the machine from being released by the holding in of a release key at the end of any operation, it becomes necessary to render this non-repeat detent 116 ineffective during the second regular cycle of a multiplying operation, so that the pin 110, after it has been restored to the position shown in Fig. 3 during the last multiplying cycle, may on the subsequent cycle, which is the second regular cycle of operation, again move between the locking detent and non-repeat detent 116.

To provide for the peculiar release conditions of the machine above noted, a release shaft controller 700 (Fig. 3) is slidably mounted on a stud 701 carried by a projection 702 of the release bank supporting frame or hanger, and a collar on the shaft 320, the controller being provided with a slot 703 to surround said collar. Secured to the shaft 320 is a cam 705 cooperating with rollers 706 and 707 on the controller 700 to slide the controller to and fro to control the release shaft 39 and release of the product and release keys, as above stated.

The means for rocking the shaft 320 to operate the cam 705, will be described below, it being sufficient at this point to state, that the controller 700 is moved in the direction of its length toward the left during the first regular cycle to move an arm 704 and a shoulder 699 into contact with the pin 109 on the locking detent 108, and a pin 99 on the non-repeat detent 116, respectively. The controller 700 is maintained in such position during all of the multiplying cycles, during the second and third regular cycles of the machine, and is restored to its normal position during the last regular cycle, consequently, the locking detent 108 and non-repeat detent 116 will be held apart so that the pin 110 may, at the beginning of the second regular cycle, which occurs immediately following the last multiplying cycle, again move between the locking and non-repeat detents to maintain the machine in its released condition.

The holding up of the locking detent 108 maintains the detent 100 for the release bank, and the locking detents 155 (Fig. 2) for the product and quantity banks in their moved positions, thus retaining the depressed keys in these banks in such depressed positions during all of the multiplying cycles, the second and third regular cycles, and the fourth cycle until near the end thereof, whereupon the controller 700 is restored to its normal position, thus permitting the detents 108 and 116 to assume their normal functions, and permitting the restoring lever to operate the release shaft 39 to restore it, and consequently, the quantity, product and release keys to their normal positions.

The mechanism for rocking the shaft 320, as above noted, will now be described. Fast on the shaft 320 is an arm 708 (Fig. 2), to which is pivoted the lower end of a pitman 709 slotted near its upper end to surround the shaft 710. This shaft will be known herein as the upper control shaft. Pitman 709 carries rollers 711 and 712, adapted to cooperate with cams 713 and 714, respectively, fastened on the shaft 710. The upper control shaft 710 is given one complete rotation in a counter-clockwise direction during a complete multiplying operation. The first 90 degrees of its rotation occurs during the first regular cycle of operation. It is then idle during the required number of multiplying cycles, and finally receives the remainder of its rotation during the last three regular cycles of operation.

It can be seen from Fig. 2 that the pitman 709 is moved downwardly, just at the end of the first one-quarter rotation of the cams 713 and 714. It then remains in its downward position throughout the multiplying cycles, during which time the shaft 710 is not moved. After the multiplying cycles have been completed, the shaft 710 is given the remaining three-quarters of its rotation, and just at the end of the last quarter the pitman 709 will be moved upwardly to its normal position, thereby rocking the arm 708 and shaft 320 clockwise to their normal positions. During the second and third quarter rotations the cams move the pitman for a purpose later set forth. This movement has no effect on the control of the pitman over the operating means for the release shaft 39.

*Upper and lower control shafts*

As is fully illustrated and described in the parent case, the machine is provided with two control shafts, an upper control shaft 710, and a lower control shaft 634. The upper control shaft is shown only in Fig. 3, while the lower control shaft is shown particularly in Figs. 4 to 7. These shafts operate various cams to drive certain of the mechanisms during each of the four regular cycles of operation, but the shafts do not function during the multiplying cycles of a multiplying operation.

The lower control shaft 634 is driven directly from the main cam shaft 82 in a manner to be presently described, and the upper control shaft is driven through a train of gears (not shown in this application) driven from the shaft 634.

The mechanism for driving the lower control shaft will now be described. Fast on the main drive shaft 82 are cams 835 and 836 (Figs. 4, 6 and 35), which are adapted to cooperate with rollers 837 and 838 respectively, carried by a lever 839, loose on the shaft 634, but secured to an arm 840, which has a U-shaped notch in its outer end, adapted to cooperate with a pin 841 carried by a link 842 (Fig. 36). In the positions of the parts shown in Figs. 4 and 36, the pin 841 also cooperates with notches 828 formed in a U-shaped arm 843 pinned to a disk 844, which carries four pinions 845 (Figs. 4 and 5). All four of these pinions mesh with teeth 846 formed on the interior periphery of a ring 847 secured to a disk 825, the hub 826 of which is loose on a sleeve 848. Each of the four pinions 845 also meshes with a gear 849 fast on the sleeve 848. An aligning disk 850 (see also Fig. 7) is pinned to the ring carrying disk 825, and a similar aligning disk 851 (see also Fig. 37), together with the sleeve 848, is pinned to the lower control shaft 634.

The cams 835 and 836 are given a complete clockwise rotation during each cycle of operation of the machine, and will rock the lever 839, and arm 840, first clockwise and then counter-clockwise, and the pin 841 will impart such movement to the arm 843, and as the arm 843 is pinned to the disk 844, which carries the four pinions 845, this disk and the pinions will move first clockwise and then counter-clockwise, as seen in Fig. 5.

Means is provided for holding either the ring 847 or the shaft 634 during a portion of an operation, so that one or the other of these elements will be driven, through the pinions 845. In other words, it is evident that if during the clockwise movement of the disk 844, the gear 849 is held against movement, the pinions 845 will roll over the teeth of the gear and drive the ring 847. On the other hand, if during the reverse movement of the disk 844 and the pinions 845, the ring 847 is held against movement, it is evident that the pinions will drive the gear 849 and the shaft 634.

The parts are so proportioned that the movement imparted to the shaft 634 during the counter-clockwise movement of the disk 844 is just 90 degrees, or one-quarter of its full rotation. This shaft is given such movement during each of the regular cycles of the machine, but not during the multiplying cycles.

The means for holding, first the gear 849 and then the ring 847, in order to properly drive the control shaft 634, will now be described. The aligning disks 850 and 851 (Figs. 6, 7 and 37) have a plurality of notches cut in their periphery, which are adapted to cooperate with pins 856 and 857 carried by a retaining lever 858, loose on a shaft 883, supported by the side frame. The lever 858 has an upwardly extending arm 859, in which a slot 860 is formed. An operating lever 861 is loosely mounted on the shaft 883, and has at its upper end a slot 862, a portion of which coincides with the upper end of the slot 860. A pin 863, on a link 864, extends through the slots 860 and 862 and connects the operating lever 861 with the retaining lever 858.

Pivoted to the lower end of the operating lever 861 is a pitman 865 (Fig. 6), which at its left-hand end is bifurcated to slide on the shaft 82. The pitman 865 carries a roller 866, which cooperates with a cam groove 867, formed in a cam disk 868, fast on the shaft 82. The disk 868 is given one complete clockwise rotation during each cycle of operation of the machine, and the cam groove 867 is so formed that the pitman 865 will be moved first toward the left, where it will remain for approximately one-half of the rotation of disk 868, and then toward the right, to its normal position.

When the pitman 865 moves to the left, it will rock the lever 861 clockwise about the shaft 883, which movement through the connecting pin 863 will also rock the retaining lever 858 to a like extent. In the normal positions of the parts, as shown in Figs. 6 and 37, the pin 856 is in engagement with one of the notches in the aligning disk 851, which is fast to the gear 849 and shaft 634. Therefore, when the disk 844 carrying the pinions 845 is rocked clockwise, the gear 849 will be held and the ring 847 will be rotated. When, however, the U-shaped arm 843 has received its full clockwise movement, the pitman 865 is moved toward the left, thereby rocking the operating lever 861 and retaining lever 858 clockwise about the shaft 883 to remove the pin 856 from the notch in the aligning disk 851, and engage the pin 857 with one of the notches in the aligning disk 850 secured to the ring 847 to hold the ring against movement, and during the counter-clockwise return movement of the U-shaped arm 843, the pinion 845 will drive the lower control shaft 634 and the gear 849 in a counter-clockwise direction to an extent equal to 90 degrees of its entire movement.

*Disabling control shaft drive on adding operations*

The mechanism for disabling the drive for the control shafts on adding operations is shown in Figs. 3 and 6. It will be remembered that the link 312, shown in these figures, is differentially positioned, by the differential mechanism of the release bank. This link through arm 795 actuates the aligning segment 794. In both Figs. 3 and 6, the parts are shown in the positions that they assume on a multiplying operation. On such an operation either key 58 or key 59 is depressed, and therefore, the differential latch mechanism is disconnected from its driver in such a position that the aligner tooth 792 will enter either of the two lower notches 793 in the segment 794.

If on the other hand an adding operation is to take place, either the key 56 or the key 57 will be depressed. This will cause the differential mechanism to set the segment 794 in such a position that either of the two upper notches in the segment 794 will be opposite the aligning tooth 792. The segment 794 carries teeth 869, meshing with a segment gear 870, pinned on the shaft 783. Also fast on this shaft is an arm 871 (Fig. 6), to which is pivoted the upper end of the link 864. It can be seen from Fig. 6 that when an adding operation takes place and the segment 794 is rocked clockwise far enough to bring the upper two notches therein into cooperative relation with the aligner tooth 792, the teeth on this segment 869 will rock the segment gear 870, the shaft 783 and the arm 871 counter-clockwise, and lower the link 864 far enough to bring the connecting pin 863 carried thereby into the lower portion of the slot 860 (Fig. 7), in the retaining lever 858. The slot 862, in the operating lever 861 has an enlarged portion 872 at its lower end, which will be opposite the pin 863 after the link 864 has been lowered on adding operations.

In such positions of the parts, the retaining lever 858 is disconnected from the operating lever 861, and even though the cam 868 will drive the pitman 865 backward and forward as in multiplying operations, the movement of the pitman 865 and the lever 861 will have no effect on the retaining lever 858, and therefore, it will remain in the position shown in Fig. 6, in which it locks the gear 849 and the shaft 634 against movement. When the link 864 is in its lower position, its lower projecting end bears against a shaft 933 to lock the lever 858 against accidental movement. A powerful spring 853 (Fig. 6) is connected to the arm 843 to insure that this arm returns all the way to its normal position.

If the next operation is a multiplying operation, the segment 794 will move into the position shown in Fig. 6, which movement will rock the segment gear 870, shaft 783 and arm 871, all clockwise and raise the link to the position shown in Fig. 6, in which it engages the narrow part of the slot 862, and thereby connects the operating lever 861 and the retaining lever 858 so that the shaft 634 may be unlocked during the four regular cycles of multiplying operations to perform its functions.

*Means for disabling control shaft drive during multiplying cycles*

In order that the machine may operate properly, it is necessary to disable the control shaft drive during the multiplying cycles of operation, and then to render the driving mechanism for the control shafts effective again for the last three regular cycles of operation. It can be seen from Figs. 4, 35 and 36 that the pin 841 normally connects the arm 840 with the U-shaped arm 843, for the purpose of driving the lower control shaft, as has been previously explained.

Toward the end of the first regular cycle of operation, during which the control shaft is driven, the pin 841 is moved out of the notch in the end of the arm 840 (Fig. 35), and positioned in a notch 880 formed in keeper 881, supported by a shaft 882 and a rod 883, mounted in the side frames of the multiplier device. When this occurs, the arm 840 will be rocked idly by the lever 839 and the cams 835 and 836. The pin 841 will remain disengaged from the notch in the arm 840 until just at the end of the last multiplying cycle, at which point in the operation the pin will be returned to the position shown in Fig. 35, and therefore, on the three regular cycles which follow the multiplying cycles, the control shaft will receive the remaining three quarters of its movement.

The means for moving the pin 841 from the position shown in Fig. 35 into the notch 880 of the keeper 881, includes the link 842 which is moved under the control of a governor differential mechanism fully illustrated and described in the parent case. It is not thought necessary to describe all of this mechanism in this divisional application, and therefore, reference may be had to the parent case for that description if desired.

PRINTING MECHANISM

Printer drive

The entire printing mechanism is driven from the main driving mechanism of the register proper. This drive is illustrated in Figs. 8, 9 and 10. As shown in Fig. 8, the main drive shaft 82 of the register carries a spiral gear 1450 fast thereon, which meshes with a spiral pinion 1451 fast on a sleeve 1452, supported by the shaft 612, which is supported by a bracket 1454, projecting from the base of the machine, and in the printer frames 594, 595 and 596 (Figs. 1, 2, 3, 29 and 31). The sleeve 1452 also has fast thereon a driving disk 1455, which carries a driving pawl 1456 and a retaining pawl 1457. These pawls are connected by a coil spring 1458. The driving pawl 1456 normally has its nose in contact with lug 1459, projecting from a collar 1453 which is pinned to the shaft 612. The retaining pawl 1457 engages with the opposite side of the lug 1459, and prevents any overthrow movement of the shaft 612 at the end of an operation.

The main drive shaft 82 of the register is given one complete counter-clockwise rotation, as viewed in Fig. 8, during each cycle of operation of the machine. The spiral pinion 1451, the sleeve 1452 and the driving disk 1455 will thereby be rotated in a counter-clockwise direction (Fig. 10) a complete rotation during each cycle of operation. Due to the engagement of the driving pawl 1456 with the lug 1459 fast to the shaft 612, it is evident that this shaft will also be rotated with the disk 1455, so long as the driving pawl is in contact with the lug 1459.

Printer disabling mechanism

During certain cycles of operation of the machine, it is undesirable to have the printer operate, and therefore mechanism is provided for disabling the printer drive during these certain cycles of operation. This mechanism, with the exception of the portion thereof controlled by the multiplying device, is old and well known in machines of this type, and only a brief description thereof will be given herein.

It is unnecessary to have the printer operate during the first cycle of a total-taking operation, and the means which disables the printer during this cycle will first be described.

Fast on the left-hand end of the shaft 184 (Figs. 8 and 10), is an arm 1460, to which is pivoted a link 1461, connected at its lower end to a driving pawl disabling-yoke 1462, loosely mounted on the shaft 315. This is the shaft which supports all of the spiral pinions 314, previously described herein.

When the machine is set for total taking operations, as described in the parent case, the shaft 184 will be rocked in a counter-clockwise direction, as viewed in Fig. 8. This will rock the arm 1460 counter-clockwise, and through the link 1461 rock the disabling yoke 1462 clockwise, thereby bringing a projection 1463 thereof into the path of movement of a tail 1464 of the driving pawl 1456.

Thus it can be seen that when the disk 1455 starts to rotate in a counter-clockwise direction (see also Fig. 10), on the first cycle of the total-taking operations, the tail 1464 of the pawl 1456 will strike against the projection 1463 of the disabling yoke 1462, and the pawl will thereby be rocked clockwise out of engagement with the lug 1459, and the main drive shaft 612 of the printing device will not be driven during the first cycle of operation. The retaining pawl 1457 simply rocks counter-clockwise against the tension of the spring 1458 when it strikes the lug 1459 and rides over this lug.

During the first cycle of a total-taking operation the shaft 184 is given an additional clockwise movement and this movement through the connections above described will rock the projection 1463 farther in a clockwise direction, thereby moving it out of the path of the tail 1464 of the driving pawl 1456, whereupon the spring 1458 restores the pawl 1456 to its normal position in contact with the lug 1459. Therefore, on the second cycle of a total-taking operation, the tail 1464 will not strike against the projection 1463, but will remain in contact with the lug 1459, the shaft 1453 will be driven throughout the second cycle of a total-taking operation.

On multiplying operations the operation of this mechanism is somewhat different, and it will now be described. On multiplying operations it is desired to have the printer operate during the first regular cycle of operation, as it is during this cycle that the date, the multiplier, the multiplicand, etc., are entered on the record strip and the inserted card. The driving pawl 1456 is normally in engagement with the lug 1459, and therefore, the shaft 612 will be driven during the first regular cycle as no means is provided for rocking the pawl out of engagement with the lug.

After the first regular cycle of operation is completed, however, there are a plurality of multiplying cycles of operation, but it is not desired to have the printer operate during these cycles, nor during the second and third regular cycles of operation, which follow the multiplying cycles.

Fast on the shaft 253 (Fig. 8) is an arm 1465, to which is pivoted the upper end of a link 1466, connected at its lower end to an arm 1467 made integral with a sleeve 1468 (Fig. 10) loose on the shaft 315. The sleeve 1468 has a downwardly extending pawl disabling-arm 1469, having an inclined edge 1470, adapted to cooperate with the roller 1471, carried by the driving pawl 1456 (Fig. 9). The normal positions of the parts is such as is shown in Fig. 9, and it is evident from this figure that the pawl disabling arm 1469 will not be in position to cooperate with the roller 1471 in the normal position of these parts, and therefore, during the first regular cycle of a multiplying operation, the printer drive shaft 612 will be rotated and the printer operated.

During the first regular cycle of operation, however, the cam 1196 (Fig. 8) will be given a one-quarter rotation in a clockwise direction, as it is fast on the upper control shaft 710. The cam groove 1197 therein is so formed that during the first one-quarter rotation of the cam 1196, the pitman 1199 will be moved downwardly, thereby, through the arm 1200, shaft 888 and arm 1430, rocking the arm 1433 and shaft 253 in a counter-clockwise direction.

This movement of the shaft 253, through the arm 1465, link 1466, arm 1467 and sleeve 1468, will bring the inclined edge 1470 of the arm 1469 into the path of movement of the roller 1471, carried by the driving pawl 1456. Then, on the first multiplying cycle of operation the roller 1471 will strike the inclined edge 1470, which will cause the pawl 1456 to rock clockwise far enough to disengage its nose from the lug 1459, and thereby disconnect the driving mechanism of the machine from that of the printer. The lower end of the pawl disabling arm 1469 is provided with a finger 1472 which cooperates with a lug 1473 on the sleeve 1453 to arrest the printer shaft as the pawl 1456 is disengaged by the cam 1470 on the arm 1469. The sleeve 1468 will remain in its adjusted position throughout all of the multiplying cycles of operation, and also throughout the second regular cycle of operation, which follows the multiplying cycles.

During the third regular cycle of operation, however, after the driving pawl 1456 has passed the lug 1459, the sleeve 1468 will be rocked counter-clockwise by the cam 1196. On the fourth or last regular cycle of operation of the machine, the roller 1471 will not strike the inclined edge 1470 of the arm 1469, and therefore, it will not be disconnected from the lug 1459, so that on the continued rotation of the disk 1455 by the main drive shaft 82, the shaft 612 for the printer, will be given its rotation for the purpose of operating the printer during the last regular cycle of operation. It is necessary that the printer operate during this cycle, as it is on this cycle that the product is set up on the printing wheels and the impression thereof taken on the record strip and on the inserted card or time slip.

Type setting mechanism

It will first be described how the type wheels for printing the amounts are differentially set in acordance with the differential positioning of the actuators, under control either of the keys or of the totalizers. It will be remembered that each of the differential actuators for the amount banks differentially positions the link 312 (Figs. 1 and 2) by means of the beam 310. At its lower end the link 312 is connected to an arm 313 loose on the shaft 315 to which is pinned the spiral segment 314. This segment meshes with the spiral pinion 316 fast on the shaft 317, appropriate thereto, and supported by the printer frames 594 and 595.

Figure 11:
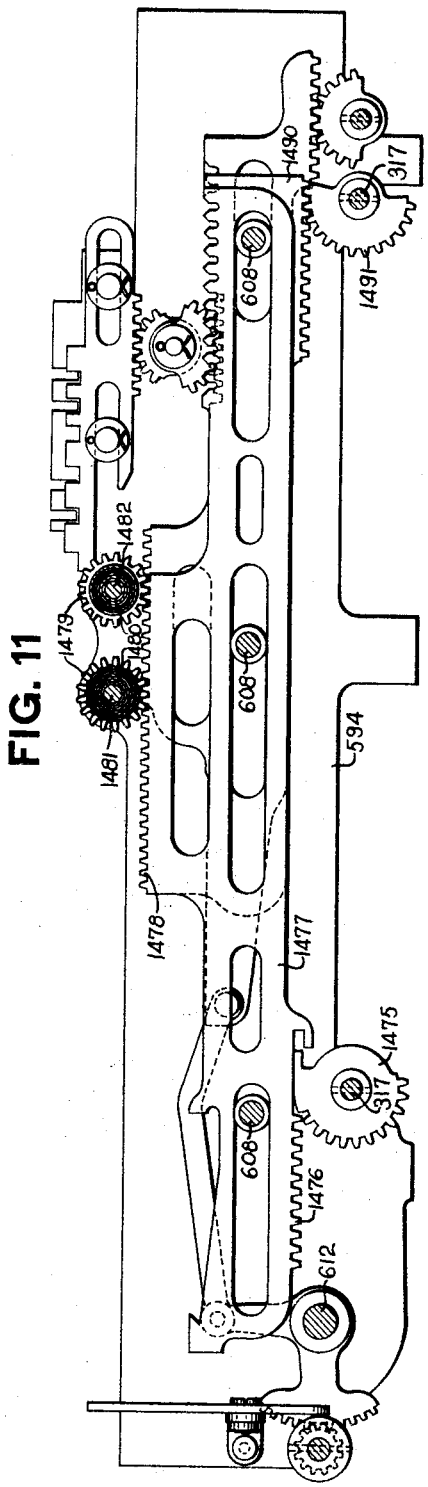
Fig. 11 is a front view of certain of the racks by which certain of the printer wheels are set.

Fast on the forward end of each shaft 317 is a pinion 1475 (Fig. 1) and on the left of Fig. 11. Only one amount shaft is shown in Fig. 11, and that is the one for the highest overflow bank. Each pinion 1475 meshes with teeth 1476, formed on the lower edge of a corresponding rack 1477 slidably mounted on the three studs 608.

It is evident that the differential movement of the actuator appropriate to any particular bank of amount keys, will be transmitted by its link 312, arm 313, spiral segment 314, spiral pinion 316, shaft 317 and pinion 1475, to its appropriate amount rack 1477. The amount racks 1477 have teeth 1478 formed on their upper edges, and these teeth mesh with pinions 1479, fast on the inner ends of a plurality of concentric sleeves 1480 (Fig. 11). The sleeves 1480 are mounted on shafts 1481 and 1482, which are in turn supported by the printer frames 594 and 595 and an auxiliary frame-plate 1553.

Each of the amount racks 1477 meshes with one of the pinions 1479 (Figs. 11 and 33). The rack of lowest denomination meshes with the front pinion 1479 on the shaft 1481. The next higher denomination rack meshes with the front pinion on the shaft 1482. The third denominational rack meshes with the second pinion on shaft 1481, and so on, the racks meshing alternately with the pinions on shafts 1481 and 1482.

On their forward ends the sleeves 1480 (Figs. 11 and 33) carry pinions 1483 meshing with appropriate amount type wheels 1484 (Figs. 12 and 34), loosely mounted on shafts 1485 and 1486 (Fig. 25), shaft 1485 supporting the type wheels for the upper type line and shaft 1486 the type wheels for the lower type line.

The differential movement imparted to an amount rack 1477 will, through the pinion 1479, sleeve 1480, pinion 1483, be transmitted to both the upper and lower type wheels 1484, setting them differentially in accordance with the setting of the differential actuators appropriate thereto.

A rack 1490 (Fig. 11) is differentially set by the release bank, as can be seen from Fig. 3. The shaft 317 appropriate to this bank, carries a segment gear 1491, which meshes with the rack 1490. There are similar racks provided appropriate to both the quantity and product banks, and they are set in the same manner as the rack 1490 for the release bank.

Figure 12:
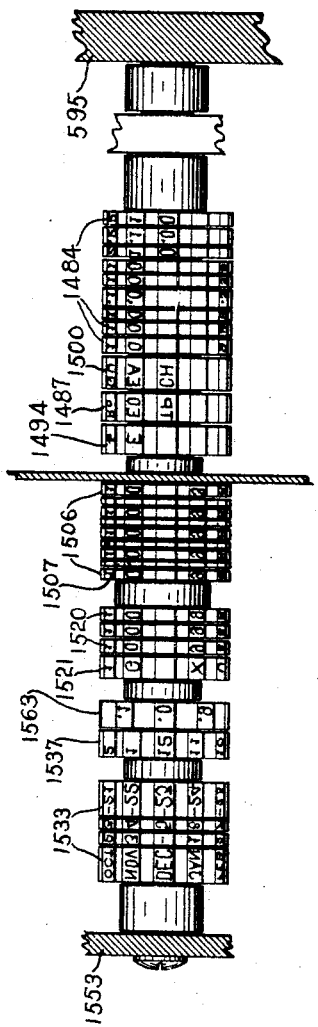
Fig. 12 is a view of the type line.

The rack 1490 carries teeth on its upper edge, which are geared and sleeved to a type wheel 1494 (Figs. 12 and 34).

The product and quantity banks through similar mechanism sets the type wheels 1487 and 1500 respectively.

*Multiplier type wheels*

The multiplier type wheels 1506 (Fig. 12) are set under control of the keys in the multiplier bank, fully shown and described in the parent case. These multiplier keys determine the positioning of sleeves 1502 (Fig. 25) which carry gears meshing with intermediate gears (not shown), which in turn set the multiplier type wheels 1506 as determined by the multiplier keys depressed.

Located between each of the multiplier type wheels 1506 is a decimal-point type wheel 1507. Each of these type wheels 1507 carries a decimal point in a different position thereon, and these wheels are adapted to be adjusted differentially by the decimal keys, so that a decimal point corresponding to the decimal key depressed will be printed in its correct position, as fully illustrated and described in the parent case.

There are also four type wheels on each of the upper and lower type lines appropriate to the operator's letter and check number. Each of the three type wheels 1520 and the type wheel 1521 (Figs. 12 and 25) meshes with an intermediate gear 1522 loose on the shaft 1482, and these gears mesh with gears 1523 fast on the forward ends of a series of sleeves 1524 nested on shaft 1503. The sleeves 1524 at their rear ends carry gears (not shown) which are adjusted by the operator's letter and check number keys illustrated in the parent case.

*Time printing wheels*

Each of the type lines also carries time printing wheels 1563 and 1537. The wheel 1563 records the minutes, and the wheel 1537 records the hours. The mechanism for setting these wheels is operated by hand, and is fully shown and described in the parent case.

*Date type wheels*

There are also four date type wheels 1533 (Fig. 12) adapted to be set in the regular way by hand operated knobs, not shown herein, but shown in the parent case.

*Illustrated slip*

Using the figures given in Fig. 32, during the first cycle of a multiplying operation the carriage 1660 is shifted toward the right and the second line of printing "Dec. 5—23 1.8 .123 Qu 2458" is printed on the large section of the slip, the carriage is then shifted toward the left, and these same characters are printed on the smaller section of the slip, the carriage is then moved to its normal position and remains there during all of its multiplying cycles, and also during the second and third regular cycles.

During the fourth regular cycle the carriage is shifted to the right into a position within one space of where the quantity is printed on the upper or large section of the slip, and the product, in this instance $3.02, is printed as well as the characters "PW" designating that this product was entered into such product totalizer. The carriage is then shifted to the left to a position one space below where the quantity 2458 is printed on the smaller section of the slip, and the product 3.02 is printed along with the characters "PW".

Figure 13:
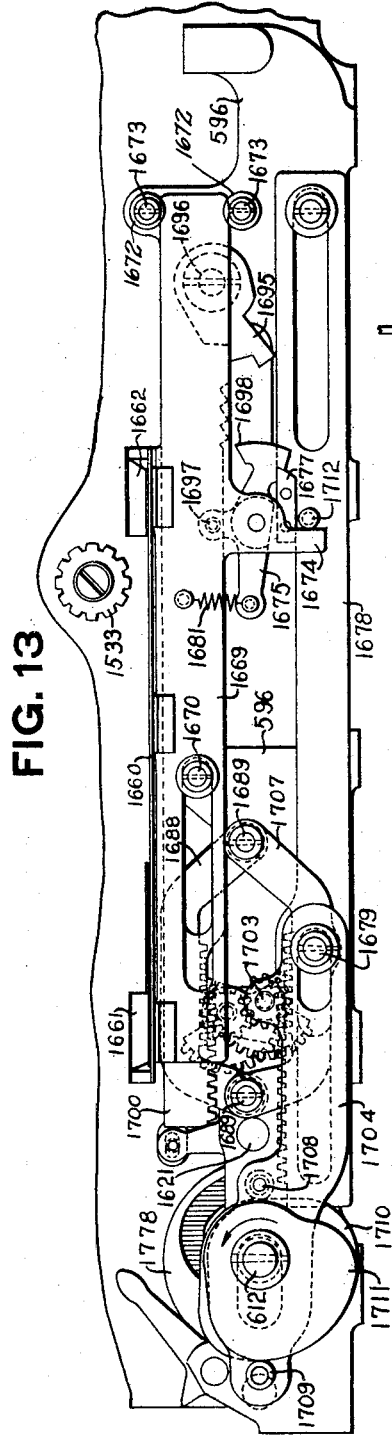
Fig. 13 is a front elevation of the carriage, and shows some of the shifting mechanism therefor.

The carriage mechanism disclosed in Figs. 13, 16 and 17 is controlled as to its various positions by the stop arm 1675 as set under the control of the release key bank.

Of the first characters printed, ".123" represents the multiplier, and "24.58" represents the multiplicand. In the next line of printing "3.02" is the product.

The top line of printing on both the large and small sections of the slip is made during an adding operation, and may be made either prior to or subsequently to the multiplying operation. The same is true of the last or fourth line of printing on each of the two sections of the slip. In the top lines "2458" represents the quantity, which quantity is, during the multiplying operation, used as the multiplicand. The figure "12740.05" represents in this particular instance the job number, and is an arbitrary figure. The figures in the last line ".23" represents the set up price which is printed during a special adding operation either before or after the multiplying.

It makes no difference whether the multiplication is performed before or after the top or bottom lines of printing, because the carriage is automatically controlled to print in the proper lines under the control of the keys in the release bank, and therefore, the operator need have no concern as to the particular place where the printing is going to happen, because all he has to do, is put the slip on the table and the machine automatically selects the proper lines to receive the printing depending upon the nature of the set up on the keyboard.

Construction of slip carriage

This machine prints upon an inserted slip such as shown in Fig. 32. Before the operation is begun, the slip is inserted into a carriage, which during the operation of the machine is positioned differentially and automatically, in order to print the various entries on the proper lines of the slip.

The construction of this carriage will now be described. The carriage is shown in Figs. 13, 18, 28 and 29. The carriage includes a table 1660, on which the inserted slip is laid. The table is provided with guides 1661 and 1662 on its left-hand and right-hand edges respectively. These guides are for the purpose of facilitating the placing of the inserted slip in its correct position on the table.

The guide 1661 has a spring finger 1663 (Fig. 29) which presses down on the slip, and helps to hold it against movement. The table 1660 is provided with an opening through which the lower hammers may operate to make an impression on the slips.

At its rear edge the table is supported by an angle bar 1664 (Figs. 28 and 31), which carries rollers 1665 and 1666 adapted to slide in channel bars 1667 and 1668, forming a track and supported by studs projecting from the printer frame 595. At its front edge (Figs. 13 and 31), the table 1660 is supported by a guide rail 1669, slidably supported near its left-hand end on a stud 1670, which projects through a slot 1671, formed in said rail. At its right-hand end the rail is slidably mounted between two rollers 1672 (Figs. 13 and 18), carried by studs 1673, which project forwardly from the front printer frame 596.

It will be seen from the above that the table 1660 and its supporting bar 1664 and rail 1669 are slidable laterally of the machine.

Mechanism for positioning carriage

Means are provided for moving the carriage from its normal left-hand position to the right, and cooperating means for moving it from its projected position to the left to its normal position. The mechanism for moving the carriage to the right will be first described.

The guide rail 1669 (Fig. 13) which supports the front edge of the carriage, has a downwardly extending projection 1674, which carries a three-armed latch or stop arm 1675 pivoted thereto, and having a notch 1676 (Fig. 18) normally engaged with a lug 1677 (Fig. 16), fastened to a driving rack 1678, slidably mounted on studs 1679 and 1680, carried by the front printer frame 596. These studs project through slots formed in the driving rack 1678.

The latch 1675 is flexibly held in contact with the lug 1677 by a spring 1681, stretched between a pin on the left-hand arm of the latch 1675 and a pin on the rail 1669 (Figs. 13 and 16). It can be seen that if the driving rack 1678 is moved toward the right, it will, through the latch 1675, carry the rail 1669 and the card table 1660 with it.

On the upper edge of the driving rack 1678 (Fig. 16), at its left-hand end are teeth 1682, which mesh with the teeth of a segment gear 1683, loosely mounted on a stud 1684, supported by an upwardly extending projection 1685 of a pitman 1686, which is slidably mounted on the stud 1679, and at its left-hand end is slotted to surround the main printer drive shaft 612.

Fast to the segment gear 1683 is a pinion 1659, which meshes with teeth 1687 formed on the under side of a stationary bar 1688, supported by two studs 1689 projecting from the printer frame 596. The pitman 1686 carries rollers 1690 and 1691, which cooperate with a pair of cams 1692 and 1693, respectively, fast on the main printer drive shaft 612.

It will be remembered that the shaft 612 (Fig. 16) is given one complete counter-clockwise rotation during each operation of the machine when printing is to take place, and the cams 1692 and 1693 are so formed that the pitman 1686 will be driven toward the right. As the pitman moves toward the right the pinion 1659, supported on the stud 1684 and fast to segment gear 1683 will be rotated in a counter-clockwise direction, as the bar 1688 is stationary, and the pinion rolls over the teeth 1687 thereof. This will drive the segment gear 1683 in a counter-clockwise direction, and due to its engagement with the teeth 1682 on the driving rack 1678, will move this rack, together with the carriage, toward the right.

The mechanism herein is so designed that the printing may take place on any one of four different lines (Fig. 32), and the selection of the proper line will be controlled by the distance which the carriage moves toward the right. That is, the carriage may be stopped in any one of its four different positions, depending upon which line of the slip the impression is to be made on.

The means for stopping the carriage in any one of its four positions, will now be described.

A stepped carriage control arm 1695 (Fig. 16) is pinned to a shaft 1696, supported by the frames 595 and 596, and is differentially positioned in a manner which will be hereinafter described. The three-armed latch 1675 has a pin 1697 projecting laterally from its upwardly extending arm, and as the carriage approaches its right-hand position the pin 1697 will strike one of the steps of the control arm 1695 and rock the latch 1675 counter-clockwise against the tension of the spring 1681 far enough to disengage the notch 1676 from the lug 1677 to disconnect the carriage from the rack in the position selected by the control arm 1695.

When the carriage is unlatched from the driving rack 1678, the lug 1677 will pass beneath the right-hand end of the latch 1675, and hold a nose 1698 (Fig. 17), formed on the upper end thereof in one of a series of notches 1699 formed in the lower edge of a driving rack 1700. It can be seen that when the lug 1677 is beneath the end of the latch 1675, this latch will be locked in engagement with the driving rack 1700. It is this rack 1700 which moves the carriage to the left, to its second printing position, that is, the position in which the duplicate print is made on the slip. Thereafter the carriage is moved to its normal position by the rack 1678 in a manner to be later described.

The rack 1700 (Fig. 17) is slidably mounted at one end between rollers supported by the studs 1673, and near its other end is slotted to slide on the stud 1670, previously described. At its left-hand end the rack has teeth 1701 meshing with a segment gear 1702, loose on a stud 1703, supported by a pitman 1704.

Fast to the side of the segment gear 1702 is a pinion 1705, which cooperates with teeth 1706, carried by a stationary bar 1707 supported by the studs 1689. The pitman 1704 is slidably mounted on the stud 1679, and also on the main printer drive shaft 612, and carries rollers 1708 and 1709, which cooperate with a pair of cams 1710 and 1711, fast on the main drive shaft 612 of the printer. It can be seen from Fig. 17 that the cams 1710 and 1711 are so designed that at the beginning of each cycle of operation of the printer, the pitman 1704 will be moved toward the right. This will roll the pinion 1705 over the teeth 1706 on the bar 1707 and rotate the segment gear 1702 in a clockwise direction.

As the segment gear 1702 meshes with the teeth 1701 on the driving rack 1700, it is apparent that this rack will be moved toward the right so as to be in position to cooperate with the nose 1698 on the latch 1675, when this latch is unlatched from the driving rack 1678.

After the latch 1675 is moved into engagement with one of the notches 1699 in the driving rack 1700, and the lug 1677 is moved beneath the right-hand end of the latch 1675, the first impression is taken. Then both of the driving racks 1678 and 1700 are moved together toward the left by their respective cams 1692—1693 and 1710—1711, maintaining their relative positions until a point is reached where the second impression is to be taken on the slip. During this movement the carriage is latched to the rack 1700, and therefore the rack 1700 moves the carriage to the left to the duplicate printing position. Both racks 1678 and 1700 stop together to allow the second impression to be taken, the rack 1700 having reached its home position and the cams 1692—1693 being provided with a dwell to accommodate such a stop of the rack 1678. After the second impression is taken, rack 1678 resumes its movement to the left, and when a pin 1712 on the rack 1678 reaches projection 1674 of the carriage, the carriage is taken along and brought to its home position.

*Automatic line selecting mechanism*

In this machine the line of the inserted slip (Fig. 32) on which the impression will be made, is selected automatically, but under the control of the keys in the release bank. "Line" here refers to the line receiving the first impression. "Automatically", used in this connection, is intended to mean that there are no separate devices which must be operated to select the line on which the impression is to be made, when such impression is made due to the selective control of the keys in the release bank.

It will first be described how the lines appropriate to a multiplying operation are selected. The slip is inserted in the machine with the top of the slip toward the left-hand end of the machine, and the lines hereinafter referred to as Nos. 1, 2, 3 and 4, are numbered from the left toward the right, as the slip lies in position on the table.

It has already been described how the line is selected by means of the stepped carriage control arm 1695, which is fast on the shaft 1696, and the mechanism which will now be described, is that which positions the control arm 1695 on multiplying operations. The arm 1695 (Fig. 16) has four steps 1720, 1721, 1722 and 1723. It is the steps 1721 and 1722 which control the positioning of the carriage on multiplying operations.

During the first regular cycle of operation for multiplying, the carriage is stopped on the step 1721, which will cause the impression to be made on the second line of the slip (Fig. 32). During the last regular cycle of operation, the carriage is stopped on the step 1722, which will cause the impression to be made on the third line of said slip.

In Fig. 16 the carriage drive is shown in its normal position, and it is evident that the pin 1697 will come into contact with the step 1721 in an immediate subsequent multiplying operation. However, after the impression has been made on the second line of the slip, the control arm 1695 is adjusted so as to bring the step 1722 into the path of the pin 1697. This is done during the first regular cycle of operation so that the mechanism is ready, when, during the last regular cycle of operation, the carriage moves toward the right to make the impression in the third line of the slip. The arm 1695 is adjusted under control of the keys in the release bank.

Means for adjusting the arm 1695 from the position in which the first step 1721 will be engaged by the pin 1697 to the position in which the second step 1722 will be engaged by the pin 1697, will now be described.

Loosely mounted on the shaft 1696 near its rear end is a gear 1725 (Figs. 19, 20 and 22) pinned to a gear-control arm 1726, which extends downwardly, and contains a triangular shaped opening 1727. Projecting through the lower end of this opening, which is just wide enough to accommodate it, is a pin 1728, supported by two links 1729, which at their upper ends are connected to an arm 1730, fast on a shaft 1731, supported by the frames 594 and 595. The pin 1728 also projects into the open end of a bifurcated arm 1738 (Figs. 19 and 20), fast on a sleeve 1739, loosely mounted on a shaft 1740, supported by the frames 595 and 596. Also fast on the sleeve 1739, as shown in Fig. 24, is a downwardly extending arm 1741, to which is pivoted the right-hand end of a pitman 1742.

The left-hand end of the pitman 1742 is adapted to slide on the main drive shaft 612, of the printer. It carries a roller 1743, which cooperates with a cam groove 1744, formed in a cam disk 1761, fast on the shaft 612. During each cycle of rotation in which the printer operates, the cam 1761 will cause the pitman 1742 to be moved to the right and then to the left to its normal position. The movement to the right of the pitman 1742 will rock the arm 1741, sleeve 1739 and the bifurcated arm 1738 in a counter-clockwise direction to position the pin 1728 in the broadened section of the opening 1727, as is shown by full line in Fig. 38.

Figure 15:
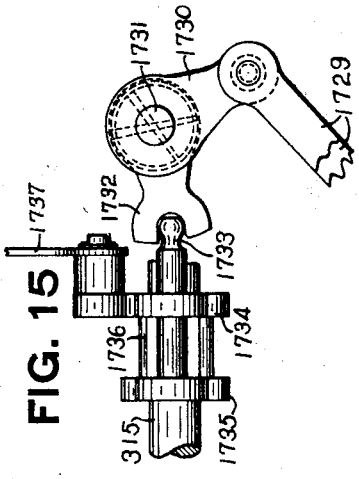
Fig. 15 is a detail view of a part of the mechanism controlling the positioning of the printer carriage for printing the product.

After the pin 1728 has been moved to the position shown by full lines in Fig. 38, the arm 1730 is rocked clockwise to thrust the link 1729 to the position shown by broken lines (Fig. 38). The mechanism for effecting such clockwise movement of the arm 1730 includes a bifurcated arm 1732 fast thereon (Figs. 15 and 22), the bifurcated portion of which cooperates with a pin 1733, projecting laterally from, and supported by arms 1734 and 1735, connected by a sleeve 1736. These arms and the sleeve are loose on the shaft 313, which supports all of the spiral segments 314, previously described.

Pivoted to the arm 1734 is a link 1737, which at its upper end is pivoted to the arm 764 (Fig. 2). During the middle of the first regular cycle of operation the arm 764 is rocked clockwise by the cam 757, which is fast on the shaft 320. This movement of the arm 764 will, through link 1737, rock the arm 1734 and the pin 1733 in a clockwise direction (Figs. 2 and 22), thereby rocking the bifurcated arm 1732, shaft 1731, and arm 1730 clockwise (Figs. 20 and 38). The arm 1730 thrusts the link 1729 to position the pin 1728 against the left-hand wall of the opening 1727, as shown by broken lines in Fig. 38.

Near the end of the first regular cycle of operation, and after the pin 1728 has been moved against the left-hand wall of the opening 1727, the pitman 1742 (Fig. 24) is moved toward the left to its normal position, thereby rocking the bifurcated arm 1738 clockwise. The arm 1730 has by this time rocked clockwise, thereby positioning the pin 1728 in the upper left-hand corner of the opening 1727 (Fig. 38), so that when the bifurcated arm 1738 rocks clockwise to its home position, as shown in Fig. 20, the pin 1728 will contact with the left-hand surface of the opening 1727 and cam the arm 1726 in a clockwise direction from the broken-line position (Fig. 39) to the full-line position.

The gear 1725 meshes with a pinion 1746 loosely mounted on a stud 1747, carried by an arm 1748 (Fig. 19), fast on the shaft 1696. Fast on the side of the pinion 1746 is a pinion 1749, which meshes with a gear 1750, loose on the shaft 1696, but secured to a yoke 1751, also pivoted on this shaft. An arm 1752 (Fig. 21) of the yoke is pivoted on one end of a link 1753, pivoted at its opposite end to an arm 1754, loose on the shaft 1731. Connected to the arm 1754 is a stop arm 1755, which has a curved surface 1756 cooperating with the periphery of a disk 1757, fast on the shaft 317, for the release bank (Fig. 3).

It can be seen from Figs. 19 and 20, that when the arm 1726 is moved clockwise, as above described, the gear 1725, which is fast thereto, will also be rocked clockwise. This movement of the gear 1725 would normally tend to rock the pinions 1746 and 1749 in a counter-clockwise direction, but due to the fact that the pinion 1749 meshes with the gear 1750, and that this gear is held stationary at this time, it is evident that the pinions 1746 and 1749 will roll over the teeth of the gear 1750, and will rotate the arm 1748 and the shaft 1696 clockwise one step. It can be seen from Fig. 16 that when the control arm 1695 is moved clockwise one step, the step 1722 will be moved into the path of the pin 1697, and therefore, the carriage will be stopped in such a position that the impression will be made on the third line of the slip. The setting of the arm 1695 takes place during the latter part of the first regular cycle of operation. The printing of the product, however, it will be remembered, does not take place until the last regular cycle of operation of the machine, and therefore, the parts will remain in their adjusted positions throughout the multiplying cycle, and also the second and third regular cycles of operation.

During the last regular cycle of operation, after the impression has been taken in the third line of the slip, the cam 767 acts upon the arm 764, which in turn lowers the link 1737 and rocks the arm 1734 counter-clockwise about the shaft 315, thereby rotating the arm 1732, shaft 1731 and arm 1730 in a counter-clockwise direction a sufficient distance to return the parts to their normal positions. As in the first regular cycle, however, before the arm 1730 is rocked counter-clockwise, the cam 1761 (Fig. 24) will rock the bifurcated arm 1738 counter-clockwise, to move the pin 1728 into the upper end of the opening 1727. So that when the arm 1730 rocks counter-clockwise, the pin will move up against the right-hand side of the opening. Then near the end of the last regular cycle of operation, when the cam 1761 returns the pitman 1742 to its normal left-hand position the bifurcated arm 1738 will be rocked clockwise to its normal position, and the pin 1728 will cam the arm 1726 counter-clockwise to its home position. As the gear 1750 is again held against movement at this point in the operation, the counter-clockwise movement of the gear 1725 by the arm 1726 will cause the pinions 1746 and 1749 to roll over the teeth of the gear 1750 and return the arm 1748 and shaft 1696 in a counter-clockwise direction to their home positions in which the step 1721 is in position to cooperate with the pin 1697.

It can be seen from the above description that during multiplying operations the carriage will first be positioned to print on the second line, due to the fact that the step 1721 which selects the second line is normally in position to cooperate with the pin 1697. During the first regular cycle of operation, however, after the impression has been made on the second line of the slip, the control arm 1695 is adjusted to bring the step 1722 into position to cooperate with the pin 1697, when the carriage next moves to the right to take an impression during the fourth or last regular cycle of operation. Then after the impression has been taken in the last regular cycle, the arm 1695 is readjusted to its normal position so that it will be in readiness for another multiplying operation, if necessary.

The mechanism will now be described, which operates under control of the keys 56 and 57 in the release bank, to position the arm 1695 in adding operations. If the key 56 in the release bank is pressed, it is desired to have the impression taken in the first line of the slip, and if the key 57 is pressed, it is desired to have the impression made on the fourth line of the inserted slip. The mechanism whereby this is accomplished will now be described.

It will be recalled that the differential mechanism for the release bank rotates the shaft 317 appropriate thereto to different extents, depending on which key is depressed. Fast on the forward end of the shaft 317 for the release bank is a disk 1758 (Figs. 3, 19, 21 and 22) which carries a pin 1759 adapted to cooperate with a slot 1760 cut in the stop arm 1755. It will be remembered that on multiplying operations either of the keys 58 or 59 is depressed, to release the machine, and on multiplying operations the shaft 317 and the disk 1758 are adjusted differentially. However, the pin 1759 is so placed on the disk 1757 that on multiplying operations the movement of the disk 1758 is not sufficient to bring the pin into the slot 1760, in stop arm 1755. If the key 57, however, is depressed, the differential mechanism will move farther before its latch is disconnected, and therefore, the pin 1759 will move into cooperative relation with the slot 1760 in stop arm 1755 and will rock this arm in a counter-clockwise direction. This movement of the arm 1755 is permitted, due to a recess 1762 in the disk 1757 previously described.

The counter-clockwise movement of the arm 1755 will rock the arm 1754 also counter-clockwise, and this movement, through the link 1753, will rock the arm 1752 and yoke 1751 in a counter-clockwise direction. At its forward end, it will be recalled, the yoke 1751 is fastened to the gear 1750, and therefore, this gear will also be rotated counter-clockwise. The movement of the gear 1750 will drive the pinions 1746 and 1749, but as the gear 1725 is held against movement during this time the pinions 1746 and 1749 will roll clockwise about the teeth of the gear 1725, which will rock the arm 1748 and the shaft 1696 clockwise far enough to bring the step 1723 of the control arm 1695 into the path of pin 1697. This position of the arm 1695 will cause the latch 1675 to be disconnected from the lug 1677 when the carriage reaches the position in which the impression will be made on the fourth or right-hand line of the slip.

If the key 56 is depressed on an adding operation, the shaft 317 will be rocked differentially far enough to move the pin 1759 into cooperative relation with the slot 1760 in the stop arm 1755, and thereby rock this arm to a greater extent by one step than was done during the last described operation, when the key 57 was depressed.

By the same means described in connection with the above mentioned operation, the control arm 1695 will, therefore, be rotated in a clockwise direction another step of movement, or three steps from its normal position, thereby bringing the step 1720 into the path of the pin 1697. This position of the arm 1695 will permit the carriage to move to its extreme right-hand positions in which the impression will be made in the uppermost line of the inserted slip.

Figure 14:
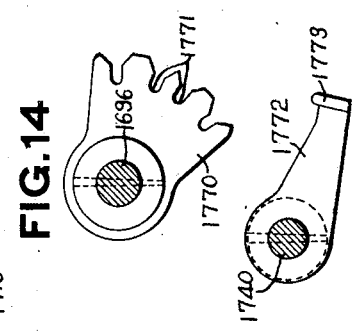
Fig. 14 is a detail view of the aligning mechanism for the carriage stop selecting means.

The control arm 1695 for selecting the line on which the impression is to be made, is adapted to be aligned in any one of its four positions. The aligning mechanism includes a segment 1770 (Figs. 14 and 22) fast on the shaft 1696. This segment has four notches 1771 cut in its periphery, there being one notch appropriate to each position of the control arm 1695. It is apparent that as the segment 1170 is fast on shaft 1696, which also carries the arm 1695, the segment will be differentially adjusted by the same mechanism that adjusts the said arm.

Fast on the shaft 1740 is an aligning arm 1772 (Figs. 14 and 25), which has its end 1773 bent at right angles, in order to cooperate with the notches 1771 in the segment 1770. At the proper time during the operation of the machine, the shaft 1740 is rocked counter-clockwise, as viewed in Fig. 14, thereby bringing the bent end 1773 of the arm 1772 into one of the notches 1771 in segment 1770, and thereby aligning and holding the shaft 1696 and the control arm 1695 against movement.

The means for rocking the shaft 1740 is shown in Fig. 25, and includes an arm 1774, fast on the outer end of this shaft to which is pivoted the right-hand end of a pitman 1775. This pitman at its left-hand end is adapted to slide on the main printer drive shaft 612, and carries a roller 1776, which cooperates with a cam groove 1777 in a cam disk 1778, fast on the main drive shaft 612, of the printer. This disk is given a complete counter-clockwise rotation during each cycle of operation of the machine in which the printer is operated, and the cam groove 1777 is so timed that after the control arm 1695 has been adjusted, the pitman 1775 will be moved toward the left, as viewed in Fig. 25, thereby rocking the arm 1774 and shaft 1740 in a counter-clockwise direction in order to bring the aligning arm 1772 into cooperative relation with the aligning segment 1770.

*Lower impression mechanism*

The mechanism which will now be described is for the purpose of taking an impression from the lower type line on the inserted slip. The lower impression mechanism includes seven different platens 1790 (Figs. 23, 25, 27, 29 and 30). Each of the platens 1790 is supported by a U-shaped platen head 1791, riveted to the right-hand end of an arm 1792, loose on the shaft 1641. In order to take an impression from the lower type line the platens 1790 together with the platen carrying arms 1792 are rocked clockwise about the shaft 1641 a certain distance, and are then released, whereupon they are thrown violently against the under side of the inserted slip to make an impression thereon from the type wheels. The platens are divided into two groups.

The four platens located nearest the front of the machine, as viewed in Figs. 23 and 29, do not operate on every operation, but are disabled on certain operations, in a manner which will be hereinafter described.

The three innermost platens operate on every operation of the machine when there is a slip in the machine. If no slip has been placed on the table, all of the platens will be disabled, as will be presently described.

In order to rock the hammers clockwise, and then return them counter-clockwise to make the impression, the following mechanism is provided. Loosely mounted on the shaft 1641 are yokes 1793 and 1794 (Figs. 23, 25, 27 and 30), the yoke 1793 being appropriate to the forward group of four platens, and the yoke 1794 being appropriate to the rear group of three platens above mentioned. The rear ends of each of the yokes 1793 and 1794, have laterally projecting noses 1795, adapted to cooperate with notches 1796 formed in trip arms 1797, pivotally mounted at 1798 on trip operating levers 1799, loose on the shaft 1641. The notches 1796 are held in contact with the noses 1795 by springs 1800, stretched between pins on the arms 1797 and pins on upwardly extending arms of the operating levers 1799. Pivoted to the lever 1799, appropriate to the forward group of platens, is the right-hand end of a pitman 1801 (Figs. 27 and 30), which at its left-hand end is adapted to slide on the main printer drive shaft 612. The pitman 1801 carries a roller 1802, which cooperates with a cam grove formed in the disk 1803. The cam disk 1803 rotates in a counter-clockwise direction during each cycle of operation in which the printer is operated, and the cam groove in said disk is so formed that at the proper time the pitman 1801 will be moved toward the left, as viewed in Fig. 27.

This movement will of course occur twice during each cycle as there are two impressions. As the pitman 1801 moves to the left, the trip operating lever 1799 will be rocked clockwise about the shaft 1641, in which it is carried and the trip arm 1797 will rock the yoke 1793 clockwise, thereby permitting the arms 1792 to rock in a clockwise direction. As this movement continues, a pin 1804 carried by an arm 1805, which is secured to the trip arm 1797, will come in contact with the lower release arm 1806, of a trip arm release lever 1807, fast on a shaft 1808, supported by the frames 595 and 596. When this occurs, the arm 1805, and the trip arm 1797 will be rocked counter-clockwise against the tension of the spring 1800, and as the movement continues, the notch 1796 of the trip arm 1797 will gradually be rocked out of engagement with the nose 1795 on the yoke 1793, until finally the nose is clear out of engagement with the notch, whereupon the yoke 1793 is rapidly rotated in a counter-clockwise direction, under the influence of a powerful spring 1809, stretched by the clockwise movement of the yoke 1793, and the yoke carries the arms 1792 and platens 1790 until the lower left arm of the yoke hits the base of the machine and is stopped. The arms 1792 continue their movement counter-clockwise, until the platens strike against the type wheels, thereby making an impression, on the inserted slip.

The mechanism for operating the rear group of platens is exactly the same as that for operating the forward group. The operating lever 1799 (Fig. 23) for the rearward group is fast on the shaft 1641, as is the lever 1799 for the forward group, so that when the pitman 1801 actuates the lever 1799 for the forward group, that for the rear will also be operated to a like extent, and the operation of the parts is identically the same. Duplicate reference numerals will be given to duplicate parts in the front and rear groups of platens, as far as is considered practical.

A mechanism is shown in Fig. 26 for positively returning all of the platens to their normal position and holding them slightly above the yokes 1793 and 1794, while in their normal positions. This mechanism consists of a rod 1810, supported at each end by arms 1811 loose on shaft 1641 and normally located just to the right (Fig. 25) of an upwardly projecting finger 1812 of each of the platen carrying arms 1792.

Extending to the left from the rod 1810 are two links 1813 (Figs. 23 and 26), which at their rear ends are pivoted to arms 1814, loose on the shaft 1621, but connected together by a sleeve 1815. The forward one of the arms 1814 has a downwardly extending arm 1816 which carries a roller 1817, projecting into a cam groove 1818, cut in the rear face of the cam disk 1778, previously mentioned. The cam groove 1777 in the front face of the disk has been omitted in this figure. The timing of the cam groove 1818 is such, that as the yokes 1793 and 1794 are rocked clockwise, the arms 1814 will rock in a clockwise direction, and thereby rock the arms 1811 and the rod 1810 also clockwise about the shaft 1641 to permit the platen carrying arms 1792 to rock clockwise with the yokes 1793 and 1794.

Figure 30:
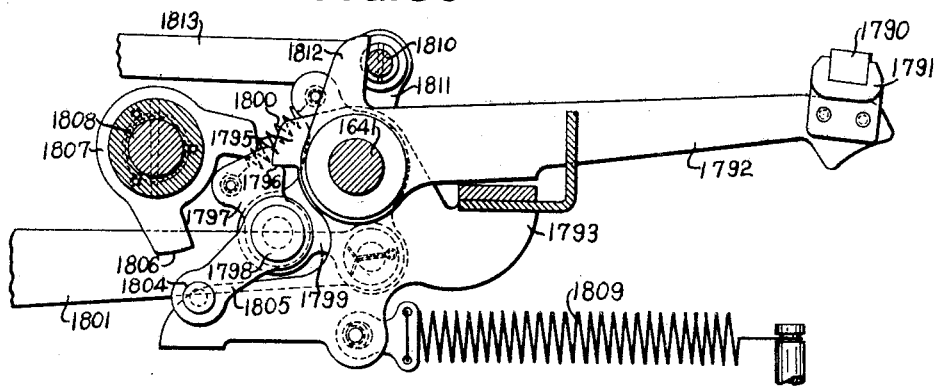
Fig. 30 is an enlarged detail view of the mechanism for tripping certain of the lower hammers.
Figure 31:
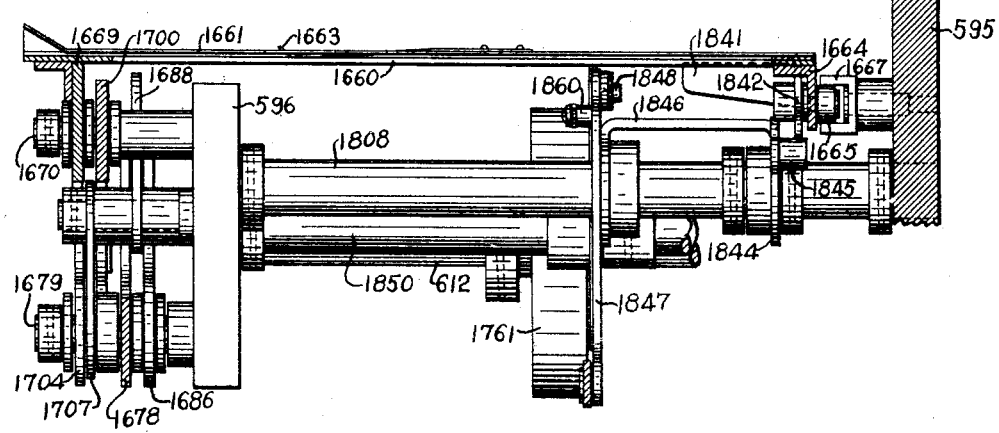
Fig. 31 is a transverse vertical section through the slip carriage and its supporting mechanism.

After the two impressions have been made on the inserted slip, the rod 1810 and arms 1811 are rocked counter-clockwise to their normal positions by the cam groove 1818 in cam disk 1778, thereby positively returning all of the platens to their normal positions and raising them slightly above the yokes 1793 and 1794, as shown in Figs. 25 and 30.

A device is provided herein for preventing rebound of the platens, after they have made their impact with the lower type line. Loosely mounted on the shaft 1641 (Fig. 27) adjacent to each of the groups of platens, is a multi-armed lever 1819. One of the arms 1820 of each of these levers carries a rod 1821, which extends over the top of the arms 1792 of its corresponding group. The rod 1821 for the forward group of platens is just long enough to extend over the four arms 1792 for the forward group, as can be seen in Fig. 23. The lever 1819 which cooperates with the rear group of platens, carries a rod 1821 just long enough to cooperate with all three of the rear arms 1792.

The levers 1819 (Fig. 27), both have downwardly extending arms 1822, to which are attached springs 1823, secured at their opposite ends to studs 1824, projecting from the base of the machine.

The springs 1823 are constantly under tension and tend to rock the levers 1819 clockwise and hold the rods 1821 in the positions shown in Fig. 27. The clockwise movement of the rods 1821 is limited by the engagement of the arm 1822 with a bracket secured to the base. When the arms 1792 are thrown violently counter-clockwise to make the impression, and after the yokes 1793 and 1794 have been stopped, the arms 1792 contact the rods 1821 and rock the levers 1819 counter-clockwise and begin to stretch the springs 1823. The springs 1823, as can be seen from the drawings, are not nearly so powerful as the springs 1809, which actuate the platens to make an impression. The kinetic energy of the arms 1792 and platens 1790 is so big, that the spring 1823 can not impede their movement.

After the platens have struck the type, arms 1792 will fall back and strike the yokes 1793 and 1794 and stretch the spring 1809 somewhat which tends to throw the platens against the type a second time and cause a smear. However, at this time, the kinetic energy is not sufficient to stretch the springs 1823 to allow the platens to strike the type wheels a second time.

*Platen disabling mechanism*

It has already been mentioned herein that the rear group of three platens operates on every operation of the printer when a slip or card is present, but that in multiplying operations the front group of four platens is disabled during the fourth regular cycle when the product is printed. This is done for the reason that there is no object in printing the data printed by the forward group of platens a second time, as it has previously been printed during the first regular cycle of operation.

It is also desirable to disable the front group of platens when the "S" key 57 in the release bank is depressed. This key is depressed when an additional amount is to be added to the amount due the operator, and it selects the fourth line from the left on the inserted slip to receive the impression, as can be seen in Fig. 32. In this case also, there is no object in duplicating the entries made during the first regular cycle of the multiplying operation.

It will be remembered that the shaft 1696

(Fig. 25) is differentially positioned under the control of the keys in the release bank. The shaft 1696, after a multiplying operation, is in the position which selects the second line of the inserted slip. Then when the product is printed, the shaft 1696 is rocked one step in a clockwise direction, in order to stop the carriage in position to print on the third line. If an entry is to be made in the fourth line of the slip, the shaft 1696 is rocked clockwise two steps from the position shown in Fig. 16.

Fast on the shaft 1696 is an arm 1825 (Figs. 23 and 25) to which is pivoted the right-hand end of a link 1826. At its left-hand end this link is pivotally connected to an arm 1827 fast on the shaft 1808. It will be remembered that the trip arm release lever 1807 is also fast on the shaft 1808, and this lever has a projecting lower release arm 1806 adapted to cooperate with the pin 1804, carried by arm 1805, for the purpose of tripping the yoke 1793 to make an impression.

When, however, the shaft 1696 is rocked either one or two steps in a clockwise direction, the movement will rock the arm 1825 clockwise, and through the link 1826 rock the arm 1827 and shaft 1808 also in a clockwise direction. This will move the lever 1807 either one or two steps in a clockwise direction. In either case a recess 1828 will be brought into position to cooperate with the pin 1804. It can be seen from Fig. 27 that when the trip operating lever 1799 is rocked clockwise and this pin 1804 does not strike the release arm 1806 of lever 1807, but cooperates with the recess 1828, the trip arm 1797 will not be disengaged from beneath the nose 1795 of the yoke 1793 for the front group of platens, and therefore, they will not be tripped and cannot be operated by the spring 1809 to make an impression.

The trip arm release lever 1807, which cooperates with the rear group of platens, that is, with the yoke 1794 for the rear group, does not have a recess 1828, and therefore, in no matter which of the four positions the lever may be placed by the movement of the shaft 1696, it will always cause the yoke 1694 to be tripped and the platens in the rear group will, therefore, always be operated.

When the shaft 1808 is rocked clockwise three steps, incidental to the selection of the first line of the slip for printing, the lever 1807 is provided with an upper release arm 1829, similar to the lower release arm 1806, previously mentioned, which will be brought into the path of the pin 1804, and therefore, when the uppermost key in the release bank is depressed, all of the platens will be tripped, as the front group will be tripped, by the upper release arm 1829 and a pin 1804, in the same manner that they are tripped when the lower release arm 1806 is in cooperative relation with the pin 1804.

When the recess 1828 is positioned in the path of the stud 1804 the printing hammers are not tripped. During such an operation of the cam 1803, the pitman 1801 rocks the yoke 1793 first clockwise and then counter-clockwise, just as when a printing operation takes place. However, during printing operations the trip arm 1797 releases the hammers to the action of their springs 1809, but when the recess is in the path of the stud 1804, such tripping is not effected, and therefore the yoke 1793 is not returned to its normal or home position by the cam 1803. This return of the yoke 1793 and hammer 1792 is not as rapid as when accomplished by the spring 1809, nevertheless it is rapid enough to cause the hammer to advance far enough after the yoke 1793 is stopped to cause a light impression to be made when no impression is desired.

To overcome such undesirable impressions a means is provided for positively preventing the platens of the front group from striking the type when said group of platens are not tripped. This means includes an arm 1830, carrying a pin 1831. This arm is integral with the three-armed lever 1819, which carries the rod 1821, extending across all of the arms 1792 for the front group. Fast on the shaft 1808, and pinned to the lever 1807 for the front group of platens, is a platen retaining arm 1832, which, when the lever 1807 is rocked clockwise in position to bring the recess 1828 thereof into cooperative relation with the pin 1804, will lie in the path of the pin 1831, carried by the arm 1830. This will positively prevent any counter-clockwise movement of the three-armed lever 1819, and therefore, it will be impossible for the platens 1790 of the front group to come into contact with the type. This, of course, applies only to the front group of platens. The rear group of platens has no mechanism like the retaining arm 1832, and therefore, the operation of those platens will not be interfered with.

*Means for disabling platen when no slip is inserted in the machine*

It is undesirable to have the platen come in contact with the ribbon, if no slip is placed in the machine during an operation, as on the next operation the slip will become ink smeared on the back. Means are provided therefore to disable all of the platens, that is, to prevent their operation, in case no slip is inserted.

The slip table 1660 has an opening 1840 (Figs. 28, 29 and 31) therein, through which extends a slip feeler 1841 carried by a lever 1842, pivoted on a stud 1843, carried by the rear angle bar 1664, which supports the table. The lever 1842 at its right-hand end is adapted to strike against the under side of the table and thereby limit the counter-clockwise movement thereof.

Loose on the shaft 1808 is an arm 1844, carrying a pin 1845 (Fig. 28) which normally lies just beneath the lever 1842. The arm 1844 is connected by a yoke 1846, to an arm 1847, also loose on the shaft 1808. At its upper end the arm 1847 is pivoted to a link 1848, which at its left-hand end is slotted, and through which projects a pin 1849, carried by a bell crank lever 1850, loose on the shaft 1621. The opposite end of the bell crank lever 1850 carries a roller 1851, which cooperates with a cam groove 1852, cut in the rear face of the disk 1761 (Fig. 23), previously described. The cam groove 1744 in the front face of the disk is omitted in this figure.

The lever 1847 at its lower end is pivoted to a link 1853 pivoted to an arm 1854, fast on a shaft 1855, supported by the printer frames 595 and 596. Also fast on the shaft 1855 are two arms 1856, which support between them a platen disabling rod 1857 (Figs. 27 and 28). Each of the arms 1792, which carries a platen 1790, has a curved face 1858 on its right-hand end which is adapted to cooperate with the rod 1857. It is apparent that if the rod 1857 is moved beneath the ends of the arms 1792, these arms will not be lowered when the yokes 1793 and 1794 rock clockwise, and therefore, cannot make an impression. The rod 1857 extends under all of the platen carrying arms, and therefore, when it has been moved into position beneath the faces 1858 of the arms 1792 it will disable them all.

This mechanism operates as follows: If a slip is inserted on the table, the opening 1840 will be closed. At the beginning of an operation of the printer, the bell crank 1850 is rocked counter-clockwise by the cam groove 1852. Bell crank 1850 is connected to the lever 1847 by a spring 1860, extending between a pin on the bell crank and a pin on the lever.

If there is a slip on the table it is apparent that the feeler 1841 of the lever 1842 cannot extend through the opening 1840, and therefore, the arm 1844 cannot be rocked counter-clockwise about the shaft 1808. As this arm is connected by the yoke 1846 to the lever 1847, this lever cannot be rocked counter-clockwise, and when the bell crank lever 1850 is rocked counter-clockwise, the spring 1860, will be stretched while the pin 1849 of the bell crank lever, will simply move to the left-hand end of the slot in the link 1848.

If, however, there is no slip in the machine, then it is clear that the feeler 1841 can move upwardly, and the lever 1842 may be rocked clockwise to permit the arm 1844, yoke 1846 and the lever 1847 to be rocked counter-clockwise when the cam groove 1852 rocks the bell crank 1850 in this direction.

When the lever 1847 rocks counter-clockwise, the link 1853 connected to its lower end will rock the shaft 1855 and the arms 1856 in a counter-clockwise direction far enough to bring the platen disabling rod 1857 beneath the faces 1858 of the right-hand ends of the platen carrying arms, thereby preventing the clockwise movement of these arms.

If the lever 1847 cannot be moved, it is apparent that the rod 1857 will remain in its normal position and the platen carrying arms 1792 will be free to rock first clockwise and then counter-clockwise by the yokes 1793 and 1794, to make an impression on the inserted slip.

The impressions from both the upper and lower type wheels are made legible on the record strip (not shown) and the inserted slip respectively by means of a continuous ink ribbon 1920 (Fig. 25), which is supported by seven rollers 1921 carried by rods 1922 extending forwardly from the frame 595. The ribbon passes about, and receives its ink, from a suitable inking roller 1923 rotatably mounted on a rod 1924. A slight tension is provided on the ribbon by means of an idler roller 1925. Any suitable means may be used to feed the ribbon in a step-by-step movement. A particularly desirable form of feeding means for use in connection with this machine is that shown and described in a Patent, No. 1,547,267, granted to Bernis M. Shipley, on July 28, 1925.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. The combination of a plurality of type wheels, a carriage movable relatively to said wheels, and a planetary gear means for positively moving said carriage in both directions.

2. The combination of a plurality of type wheels, a carriage movable relatively to said wheels, and means for automatically adjusting said carriage to a plurality of positions during a single operation.

3. The combination of a plurality of type wheels, a carriage movable relatively to said wheels, means for moving said carriage in one direction, and a single means for stopping said carriage automatically in different positions.

4. In a machine adapted to operate through a plurality of successive cycles, the combination of a plurality of type wheels, a carriage movable relatively to said wheels, means for moving said carriage from normal position into printing position, and a single means for stopping said carriage automatically in different positions on different cycles of operation.

5. In a machine of the class described, a record supporting carriage and a planetary gear system including means for positively moving the carriage to one position, means for positively moving it from said position to a second position, and means for positively moving it from said second position to its home position.

6. In a machine of the class described, a record supporting carriage, a rack for moving the carriage to any one of a plurality of positions, a rack for moving it to a corresponding one of another plurality of positions, and a single pinion to successively drive both racks.

7. In a machine of the class described, a record supporting carriage, printing elements, and a planetary gear system including means for moving the carriage to present any one of a plurality of lines of the record to the printing elements, means for moving the carriage to present a corresponding one of another plurality of lines of the record to the printing elements, and means for returning the carriage back home.

8. In a machine of the class described, a record supporting carriage, and a means for moving the carriage differentially from home position, and means for returning it a constant distance and then to home position.

9. In a machine of the class described, a record supporting carriage, means for driving the carriage forwardly positively differentially, means for driving the carriage positively a constant extent in a return direction, and means carried by the first mentioned means for driving the carriage positively to home position.

10. In a printing mechanism for a multiplying machine, the combination of a laterally movable carriage, a rack member which is given an invariable movement in one direction, means for latching said carriage to said member, and means for automatically stopping said carriage in different positions of adjustment on different cycles of operation of the machine.

11. In a printing mechanism for a multiplying machine, the combination of a laterally movable carriage, a rack member which is given an invariable movement in one direction, means for latching said carriage to said member, and a multi-shouldered arm for automatically unlatching said carriage from said rack at predetermined positions on different cycles of adjustment.

12. In a printing mechanism for an accounting machine, the combination of a laterally movable record material supporting carriage, a driver therefor, a latch connecting the carriage to the driver, means for breaking the latch in different positions, an alining plate for the latch with which the latch engages as it is broken to hold the carriage in adjusted position, means for moving the alining plate forward with the driver into the position in which it receives the latch and for returning the driver with the alining plate toward home position, and means for arresting the driver short of home position and then returning it to home position.

13. In a printing mechanism for an accounting machine, the combination of a laterally movable record material supporting carriage, a driver therefor, a latch connecting the carriage to the driver, a notched alining plate for the latch when disconnected from the driver, means for breaking the latch differentially and permitting the driver to continue its movement after the alining plate has completed its forward movement, means for returning the alining plate to its home position, and means for returning the driver simultaneously with the alining plate as the aligning plate is returned into its home position to keep the latch engaged with the alining plate, for temporarily arresting the movement of the driver as the alining plate reaches its home position and for returning the driver to its home position.

14. In a multiplying machine operable through a variable number of cycles to perform multiplication, a main operating mechanism, a printer, means included in the printer for line spacing record material during each operation of the printer, means for driving the printer from the main operating connection, and means for disabling and enabling said driving means to operate the printer twice during a multiplying operation to line space the record material.

15. In a machine capable of printing the multiplier and multiplicand and of computing the product and printing the same, of a type line, means for setting up on the type line the multiplier and multiplicand and product, impression means cooperating with said type line, record material line shifting means, means for operating the impression means and the shifting means to cause an impression to be made in a predetermined place when the multiplier and multiplicand are set up and in a different place when the product is set up, means for rendering the impression means and shifting means non-operating between said operations, and means for controlling said shifting to cause an impression to be made in said predetermined places.

16. In a machine capable of computing products, a main operating mechanism therefor, a printer including type elements, a connection between the printer and main operating mechanism, means for setting up the multiplier, multiplicand and product on the type elements, impression means, means controlling the operation of the printer for operating the impression means for printing the multiplier, multiplicand and product in non-successive cycles of the main operating mechanism, paper shifting means, and means controlling said shifting means to cause the impression of the multiplier and multiplicand and the product to be made in distinctive places.

17. In a machine capable of printing multiplier and multiplicand and of computing the product and printing the same all in one continuous operation of the machine, a bank of control keys and means controlled by certain of said keys for causing said multiplier, multiplicand and product to be printed in distinctive positions.

18. In a machine capable of printing the multiplier and multiplicand and of computing the product and printing the same all in one continuous operation of the machine, control keys and means controlled by certain of said keys for causing the multiplier and multiplicand to be printed on one line and the product to be printed on a different line.

19. In an accounting machine capable of performing processes of addition and multiplication, a bank of keys for controlling the machine to add and multiply, amount type elements, means for setting up on the type elements amounts added and multiplied, and products, means for shifting record material relatively to the type elements for line spacing, and means under control of said keys for causing said shifting means to shift said material to print amounts added and multiplied, and products, on different predetermined lines.

20. In a machine of the class described, the combination of a bank of control keys, a paper shifting means, and means under control of certain of said keys for causing the shifting means to shift the paper to the same positions said means under control of other keys causing the paper shifting means to shift the paper to other lines including a different line for each key.

21. In a machine of the class described, the combination of a bank of keys, a differential controlled by said keys, a paper shifting means, stops for said shifting means, means for adjusting said stops from said differential to different extents under control of certain of said keys, a control shaft operable under control of other keys, and means operated by said shaft for adjusting said stops to the same extent for different keys.

22. In a multiplying machine, the combination of a bank of control keys, a printer, line spacing means, and means operable under control of certain of the keys for automatically controlling said line spacing means to enable the factors of the problem to be printed at the outset of a multiplying operation, and to enable the final result to be printed on a different line near the end of such multiplying operation.

23. In a machine of the class described, a bank of control keys, a differential movable under control of said keys, a differentially positionable record material supporting carriage, means for adjusting the carriage differentially under control of said differential to present different portions of record material to a printing line, a sectional impression hammer operable in sections, means for operating one or more sections, and means also controlled by said differential for causing the operating means to operate one or more sections, always the same number of sections for any particular position of the carriage.

24. In a machine of the class described, a bank of control keys, a differential movable under control of said keys, a differentially positionable paper carriage, means for positioning said carriage, a sectional impression means operable in whole or in part, means for operating the whole or part of the impression means, and means positionable under control of said differential for controlling the position of the carriage and the impression operating means to operate the whole or part of the impression means.

25. In a machine of the class described, a bank of control keys, impression means operable in part or as a whole, and means under control of said keys for operating a part or the whole of said impression means.

26. In a machine of the class described, a bank of release keys, a differential controlled thereby, impression means operable in part or as a whole, and a settable disk operated by said differential and cooperating with the impression means for causing said impression means to be operated in part or as a whole.

27. In a machine of the class described, a bank of keys, a differential controlled thereby, impression means operable in part or as a whole, and means controlled by said differential for causing said impression means to be operated in part or as a whole.

28. In a machine of the class described, a bank of keys a differential controlled thereby, an impression means, means for operating said impression, and means controlled by said differential for determining the effectiveness of said operating means.

29. In a machine of the class described, the combination of a bank of keys, a differential, an impression hammer, a driver for said hammer, a spring urging said driver in an impression taking direction, means for moving said driver in an opposite direction to tension the spring, a pawl connected to said moving means and bearing against said driver to transmit movement to said driver in said opposite direction, a pawl tripping member provided with high points to trip said pawl, and means controlled by said differential for adjusting said member.

30. In a machine of the class described, the combination of an impression hammer, a driving means therefor, a spring for operating the driving means to take an impression, means for actuating the driving means and tensioning the spring, a pawl connecting the driving and actuating means, a pivoted member having high places to trip said pawl to release said driving means after the spring has been tensioned, a bank of keys, a differential controlled thereby, and means controlled by said differential for setting said pivoted member.

31. In a machine of the class described, the combination of an impression hammer, operating means therefor, means for preventing rebound of said hammer, means for disabling said operating means and holding said rebound preventing means to prevent movement of the hammer toward impression taking position, a bank of keys, a differential controlled thereby, and means adjusted under control of said differential for adjusting said disabling and holding means.

32. In a machine of the class described, the combination of type elements means for setting up the multiplier and multiplicand, and for computing and setting up the product on the type elements all in one continuous operation, impression means, means for operating the impression means and means for controlling said operating means to cause the whole impression means to function to print the multiplier and multiplicand at one impression, and to cause a portion only of the impression to function to print the product.

33. In a machine adapted to make a plurality of successive operations, the combination of means to control the machine to make such operations; a movable record material holder; and means under control of the first-named means to automatically give the holder shuttle movements during said successive operations, to shift the holder from one position to the printing line and to line space the holder during each shuttle movement.

In testimony whereof I affix my signature.

MAXIMILIAN M. GOLDBERG.